(12) United States Patent
    Sharp

(10) Patent No.: US 11,614,204 B2
(45) Date of Patent: Mar. 28, 2023

(54) STORAGE VESSEL LEAK DETECTION, REMEDIATION, AND METHOD OF TRAINING

(71) Applicant: FEDERAL RESOURCES SUPPLY COMPANY, LLC, Stevensville, MD (US)

(72) Inventor: Gary Sharp, Stevensville, MD (US)

(73) Assignee: FEDERAL RESOURCES SUPPLY COMPANY, LLC, Stevensville, MD (US)

(*) Notice: Subject to any disclaimer, the term of this patent is extended or adjusted under 35 U.S.C. 154(b) by 1442 days.

(21) Appl. No.: 15/449,871

(22) Filed: Mar. 3, 2017

(65) Prior Publication Data

US 2018/0252367 A1    Sep. 6, 2018
US 2020/0018444 A9    Jan. 16, 2020

(51) Int. Cl.
    *F17C 13/12*    (2006.01)
    *G01M 3/32*    (2006.01)
    *G01M 3/00*    (2006.01)

(52) U.S. Cl.
    CPC ............ *F17C 13/123* (2013.01); *F17C 13/12* (2013.01); *F17C 13/126* (2013.01); *G01M 3/00* (2013.01); *G01M 3/3272* (2013.01); *F17C 2221/012* (2013.01); *F17C 2221/033* (2013.01); *F17C 2221/035* (2013.01); *F17C 2260/038* (2013.01); *F17C 2270/0745* (2013.01)

(58) Field of Classification Search
    CPC ...... F17C 5/00; F17C 5/06; F17C 3/04; F17C 2227/00; F17C 2260/038; F17C 13/123; F17C 13/126; G01M 3/183; G01M 3/00
    See application file for complete search history.

(56) References Cited

U.S. PATENT DOCUMENTS

| | | | |
|---|---|---|---|
| 1,497,615 A | * | 6/1924 | Thompson .............. F25B 9/002 252/67 |
| 2,757,516 A | | 8/1956 | Buttolph |
| 2,859,758 A | | 11/1958 | Jurs |
| 2,903,005 A | | 9/1959 | Anderson et al. |
| 3,115,283 A | | 12/1963 | Lindgren |
| 3,768,497 A | | 10/1973 | Mueller |
| 4,043,350 A | | 8/1977 | Ichimi et al. |
| 4,656,895 A | | 4/1987 | Wilson |
| 4,969,482 A | | 11/1990 | Perrin et al. |
| 5,269,171 A | | 12/1993 | Boyer |
| 5,322,092 A | * | 6/1994 | Howeth .................... F17C 5/02 137/614 |
| 5,730,170 A | | 3/1998 | Sanchez |
| 5,894,859 A | | 4/1999 | Pavlicek |
| 6,209,562 B1 | | 4/2001 | Shaw |
| 6,719,002 B2 | | 4/2004 | Shaw |
| 6,895,952 B1 | | 5/2005 | Bachelder |
| 6,910,499 B2 | | 6/2005 | Chan |

(Continued)

*Primary Examiner* — Miguel A Diaz
(74) *Attorney, Agent, or Firm* — Hamilton, Brook, Smith & Reynolds, P.C.

(57) ABSTRACT

This application describes methods for responding to a storage vessel leakage event and the implementation of one or more assemblages of components to provide remediation of the leakage event. This application also describes methods of teaching storage vessel leakage remediation for responders and how to use the method of responding to storage vessel leakage event in combination with the one or more assemblages of components.

4 Claims, 19 Drawing Sheets

(56) References Cited

U.S. PATENT DOCUMENTS

| | | | |
|---|---|---|---|
| 7,874,314 B2 * | 1/2011 | Zuck | F16L 29/04 137/614.04 |
| 8,360,781 B2 | 1/2013 | Gorman et al. | |
| 9,103,450 B2 | 8/2015 | Street et al. | |
| 2011/0101681 A1 | 5/2011 | O'Connor | |
| 2014/0021394 A1 | 1/2014 | Street et al. | |
| 2015/0047473 A1 | 2/2015 | Ryans | |

* cited by examiner

STORAGE VESSEL LEAK DETECTION, REMEDIATION, AND METHOD OF TRAINING

TECHNICAL FIELD

The present disclosure relates to the assessing and subsequent remediation of leaks from liquid/compressed gas storage cylinders, such as propane, natural gas, ammonia, and carbon dioxide, tank systems and, more particularly, to a controller unit and a training and assessment method for enabling responder personnel to assess and/or remediate leakage of such liquid/compressed gas from such a system.

BACKGROUND

First responders must make rapid decisions in life-saving and life-threatening situations when dealing with hazardous situations that include, for example, flammable and/or combustible materials being released into the environment. Emergency personnel must be adequately trained to properly react to the various types of hazardous events, for both their safety as well as public safety.

Given this, the incident first responder commander must rapidly process information during a hazardous incident and make the appropriate decisions for action based upon his own cognitive abilities to mentally process such information with or without the help of subordinates. Although training manuals and field manuals may be available, timely access and processing of this information remains elusive, and decisions made on this less-than-optimal information may prove detrimental. Importantly, the known detection methods give the responder a variety of information, however the key is to understand is what you are dealing with and to have a quick and efficient method of risk assessment and abatement or remediation of an incident in minutes.

Propane gas leaks can obviously cause serious problems. For example, fires resulting from such leaks can cause both property damage and personal injury including, in extreme cases, death. Likewise, an ammonia gas leak can result in damage to the respiratory system of persons remotely located from the site of such leakage. Thus, a very real need exists for an approach in testing for such leaks that will effectively protect the public. Such protection would also be of substantial benefit to the companies that provide and service such systems as well as volunteer and professional first responders. In many cases, leakage is often from systems that have inadvertently been damaged, have not been properly maintained, or have been left on at the. In any event, whatever the cause of such leakage, it is advantageous to be able to readily determine where there is leakage is from and to have a plan of action in its remediation.

SUMMARY

It is an object of the present disclosure to provide a method of providing information for determining, as part of a response to a storage vessel leakage event, at least one type of storage vessel associated with the leakage, or a valve or a fitting associated with the storage vessel relating to the storage vessel from a representation, the representation being provided in fixed medium or an electronic display, the representation separating a first group of storage vessels and a second group of storage vessels from the at least one type of storage vessel, the first storage vessel group selected from DOT compressed gas and liquid storage cylinders, and the second storage vessel group selected from ASME compressed gas and liquid storage tanks; providing a first assemblage of components, each of which are configured to couple or attach to the first storage vessel group, the valve or the fitting thereof, for use by a responder in responding to the storage vessel leakage event; and obtaining information from the representation relating to implementation of the first assemblage of components and the first storage vessel group, the valve or the fitting thereof, for remediation of the storage vessel leakage event; or providing a second assemblage of components, each of which are configured to couple or attach to the second storage vessel group, the valve or the fitting thereof, for use by a responder to the storage vessel leakage event; and obtaining information from the representation relating to implementation of the first assemblage of components and the first storage vessel group, the valve, or the fitting thereof, for remediation of the storage vessel leakage event; and remediating the storage vessel leakage event of the first storage vessel group or remediating the storage vessel leakage event of the second storage vessel group.

It is another object of the present disclosure to provide a controller assembly comprising: a threaded coupling at a first end and an opposing end; a pressure gauge coupled to the first end; and a quick shut off valve coupled to the pressure gauge and the opposing end, the quick shut off valve having an open state where fluid flow between the first end and the opposing end is provided, and a second state where fluid flow between the first end and the opposing end is prevented; wherein the controller assembly is configured to couple at the first end with a storage vessel unintentionally releasing compressed gas and liquid.

It is an object of the present disclosure to provide a method of training a responder to address a storage vessel leakage event, the method comprising providing identification parameters as to a first storage vessel group and a second storage vessel group, the first storage vessel group selected from DOT compressed gas and liquid storage cylinders, and the second storage vessel group selected from ASME compressed gas and liquid storage tanks; providing a plurality of leakage event scenarios associated with each of the first storage vessel group and the second storage vessel group; and providing at least one first remediation protocol corresponding to an implementation of a first assemblage of components and the first storage vessel group, the valve, or the fitting thereof, for remediation of one or more of the plurality of storage vessel leakage event scenarios, each of the first assemblage of components being configured to couple or attach to the first storage vessel group, the valve or the fitting thereof, for use by a responder in accordance with the at least one first remediation protocol; or providing at least one second remediation protocol corresponding to an implementation of a second assemblage of components and the second storage vessel group, the valve, or the fitting thereof for remediation of one or more of the plurality of storage vessel leakage event scenarios, each of the second assemblage of components, configured to couple or attach to the couple or attach to the second storage vessel group, the valve or the fitting thereof, for use by a responder in accordance with the at least one second remediation protocol.

BRIEF DESCRIPTION OF THE DRAWINGS

Figures 24, 25:
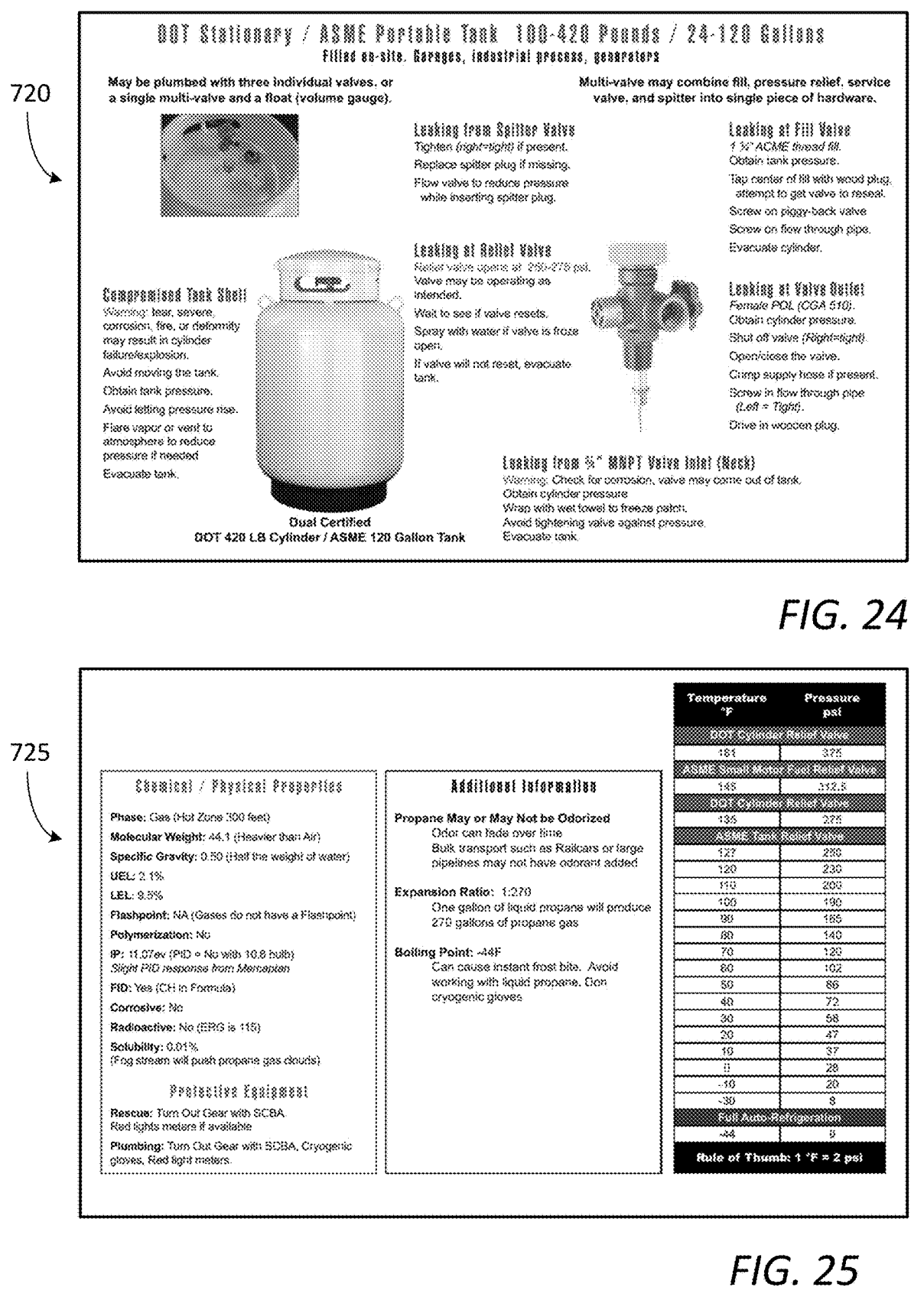

FIG. 24 shows another portion of a representation providing a framework to capture procedures and tactical information.

FIG. 25 shows physical properties and parameters and other information of an exemplary liquid/compressed gas (propane) common to the containment/dispensing vessels disclosed and described herein.

DETAILED DESCRIPTION

Figure 1:
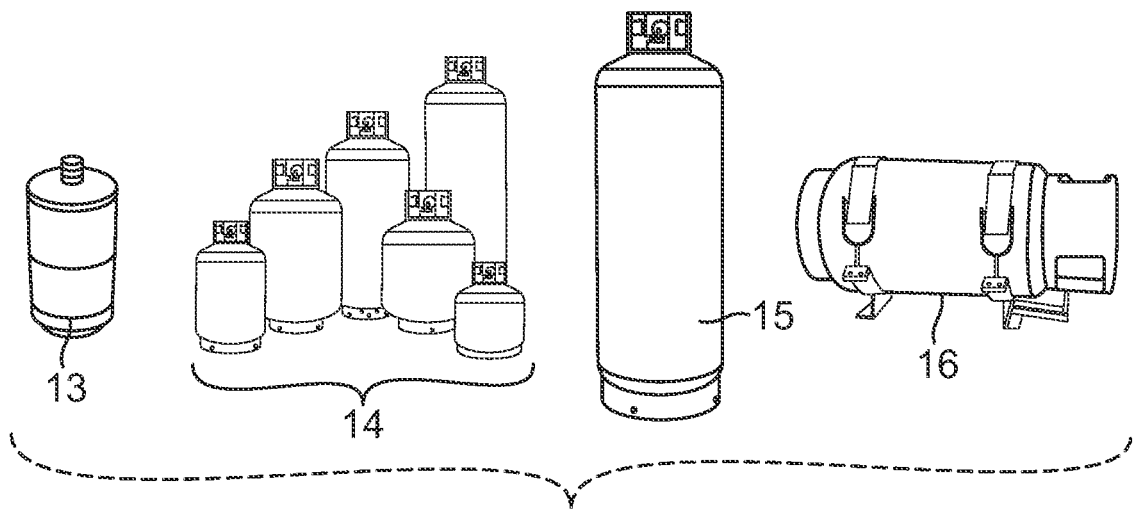
FIG. 1 provides an illustration of various DOT vessels for containing/dispensing compressed gas and liquid form contents that are exemplified together with the apparatuses and methods of the present disclosure.

Before the present methods and apparatuses are described, it is understood that this disclosure is not limited to the particular methodology, protocols, and reagents described, as these may vary. It also is to be understood that the terminology used herein is for the purpose of describing particular embodiments only, and is not intended to limit the scope of the present disclosure that will be limited only by the appended claims.

Definitions

For the purposes of promoting an understanding of the embodiments described herein, reference will be made to preferred embodiments and specific language will be used to describe the same. The terminology used herein is for the purpose of describing particular embodiments only, and is not intended to limit the scope of the present disclosure. As used throughout this disclosure, the singular forms "a," "an," and "the" include plural reference unless the context clearly dictates otherwise. Thus, for example, a reference to "a cylinder" includes a plurality of such cylinders, as well as a single cylinder or a collection of similar or dissimilar cylinders containing the same substance.

As used herein, the term "vessel" is inclusive of storage devices generally used and/or approved by one or more regulatory authorities to contain compressed gas together with its liquid form and dispense, by way of one or more valves, ports, or other access points, the contents therein. Such vessels are, for example, commonly used in the containment and dispensing of natural gas, propane, ammonia, and carbon dioxide.

As used herein, the terms "cylinder" and "tank" are subset storage vessels as used herein, such cylinder and tank storage medias being those generally used to contain compressed gas together with its liquid form and to dispense the contents therein.

As used herein, the following acronyms have the following meanings:
ASME: American Society of Mechanical Engineers
CGA: Compressed Gas Association.
The HazMatIQ Tactics: PropaneIQ
DOT: Department of Transportation
NPG or NGT: National Gas Taper, as defined in ANSI/CGA V-1 (B57.1)
NPT: National Pipe Thread, as defined in ANSI B1.20.1
POL: Prest-O-Lite brand couplers and its equivalents
QCC: Quick Closing Coupler
UN: Unified National Fixed Pitch Series, as defined in ANSI/ASME B1.1 with modifications defined in ANSI/ASME SAE AS8879.

There are many thread forms available on equipment used in the LP-Gas industry, for example. The variety of letters, numbers and symbols that are used with various thread specifications may be confusing to first responders arriving at a leakage event concerning one or more vessels used in the LP-gas industry.

The presently disclosed methods and apparatus are configured for use with DOT propane cylinders as well as DOT propane tanks and ASME tanks. DOT propane cylinders include, for example, disposable cylinders such as those configured for camp stoves or lanterns; portable cylinders, such as those configured for barbecue grills and patio heaters; exchange cylinders, such as those configured for food trucks, food carts, tent heaters, construction trailers;

and motor fuel cylinders, such as those configured for forklifts, floor buffers, and lawnmowers.

ASME tanks, such as portable tanks with a capacity of 44-120 gallons; motor fuel/mobile fuel tanks with a capacity of 4-110 gallons; and stationary tanks (above or below ground) having a capacity of 100 to 2000 gallons are also included among those advantageously serviced by the presently disclosed methods and apparatuses.

With reference to FIG. 1, and corresponding to the methods and apparatuses of the present disclosure, various exemplary types of DOT cylinder-type vessels for containing/dispensing compressed gas and its liquid form are shown, such as: a disposable cylinder 13, typically used with camp stoves and lanterns; a portable cylinder 14, typically used for barbecue grills and/or patio heaters; and exchange cylinder 15, typically used for food trucks/carts, tent heaters, and construction trailers; a motor fuel cylinder 16, typically used with forklifts, floor buffers, and lawnmowers/landscaping equipment. Other DOT cylinder-type vessels maybe used in carrying out the methods and/or using the apparatuses disclosed herein.

Figure 2:
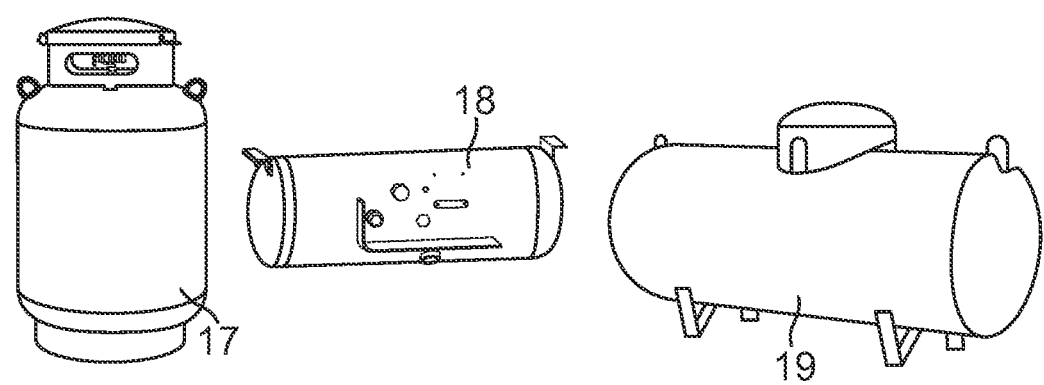
FIG. 2 provides an illustration of various ASME vessels for containing/dispensing compressed gas and liquid form contents that are exemplified together with the apparatuses and methods of the present disclosure.

With reference to FIG. 2, and corresponding to the methods and apparatuses of the present disclosure, various exemplary types of ASME tank-type vessels for containing/dispensing compressed gas and its liquid form are shown, such as: a portable tank 17 of about 44-120 gallon capacity; a motor fuel/mobile fuel tank 18 of about 4-110 gallon capacity; and a stationary tank 19 (above or below ground) with a capacity of about 100-2000 gallons. Other ASME tank-type vessels maybe used in carrying out the methods and/or using the apparatuses disclosed herein.

In one embodiment, an assemblage of components useful for carrying out the presently disclosed methods is provided. As used herein the term "assemblage" is used interchangeably with "kit." In one aspect, a first kit is provided for assisting and/or supporting emergency responders to incidents involving a particular type of vessel, such as DOT propane cylinders, including but not limited to disposable cylinders typically used in camp stoves and lanterns; portable cylinders, typically used for barbecue grills and patio heaters; exchange cylinders, typically used for food trucks, food carts, tent heaters, and construction trailers; and motor fuel cylinders, typically used for forklifts, floor buffers, and lawnmowers.

In another aspect, a second kit is provided for assisting and/or supporting emergency responders to incidents involving a particular type of vessel, such as ASME tanks, including, but not limited to portable tanks having a capacity of about 44-120 gallons; motor fuel/mobile fuel tanks having a capacity of about 4-110 gallons; and stationary tanks, above or below ground with a capacity of about 100-2000 gallons.

In another aspect, the first and the second kit are provided, accompanied, or associated with representation, e.g., instructions, for assessing and remediating various event scenarios. Such instructions may take the form of placards, notebooks, and the like. Such instructions may also include mobile apps or other electronic media accessible by mobile or smart phones. In yet another aspect, the first and the second kit are provided together for assisting and/or supporting emergency responders to incidents involving one or more of the particular type of DOT vessels.

Figure 3:
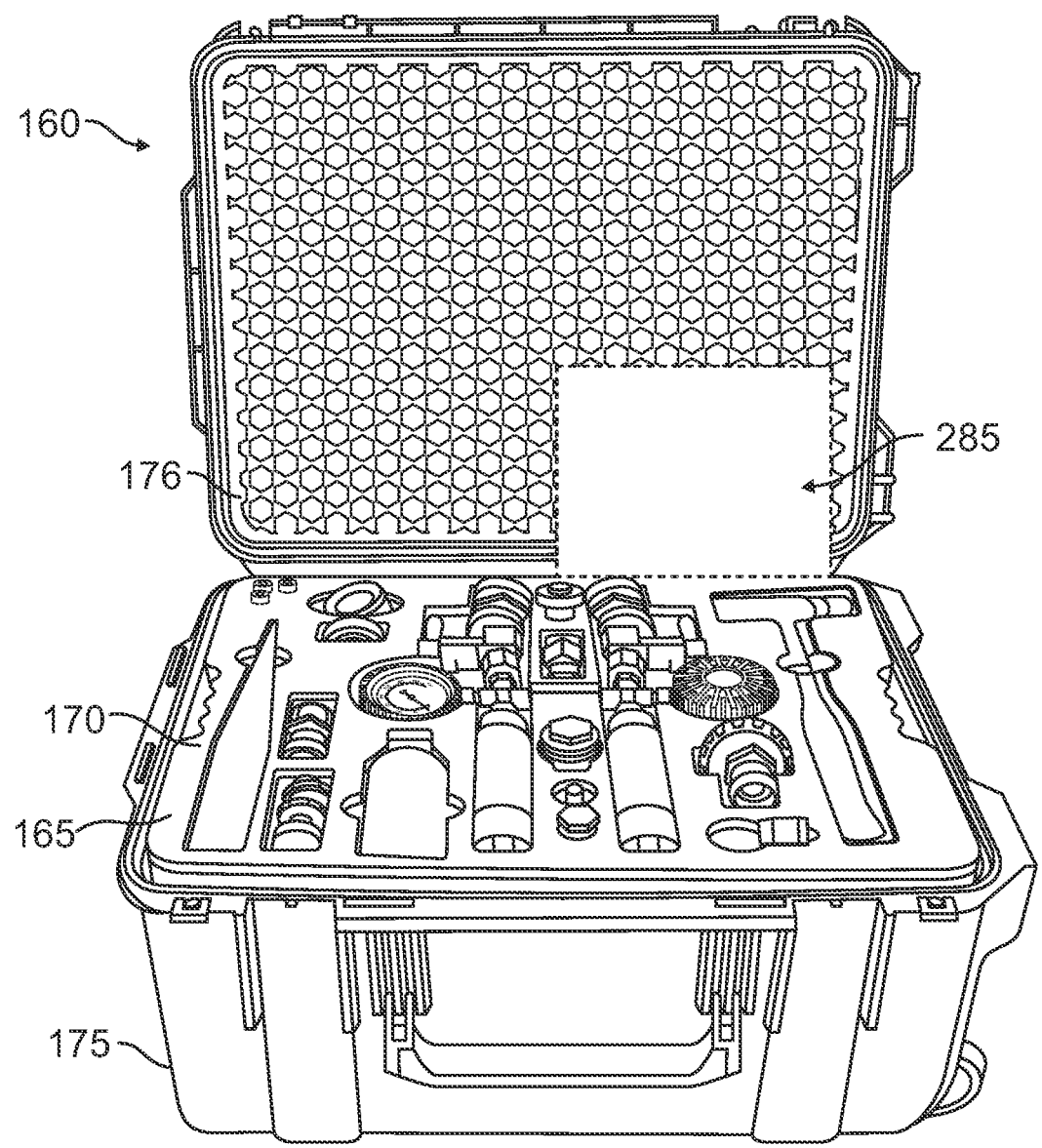
FIG. 3 shows a first assemblage or kit of components useful in carrying out the methods of the present disclosure.
Figure 4:
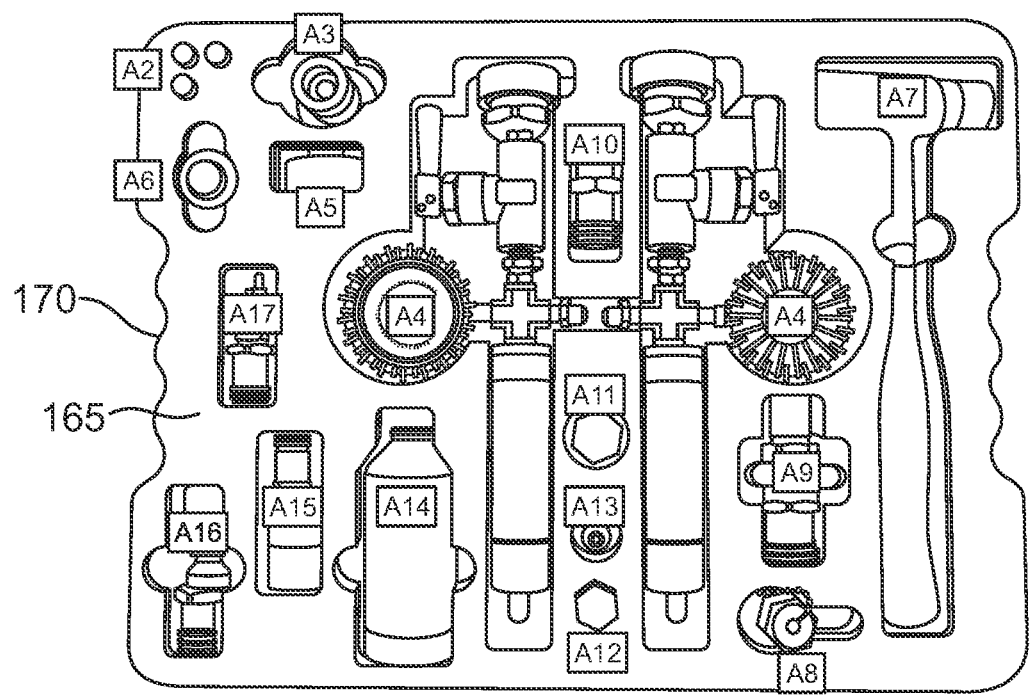
FIG. 4 shows a first level arrangement of components of FIG. 3.
Figure 5:
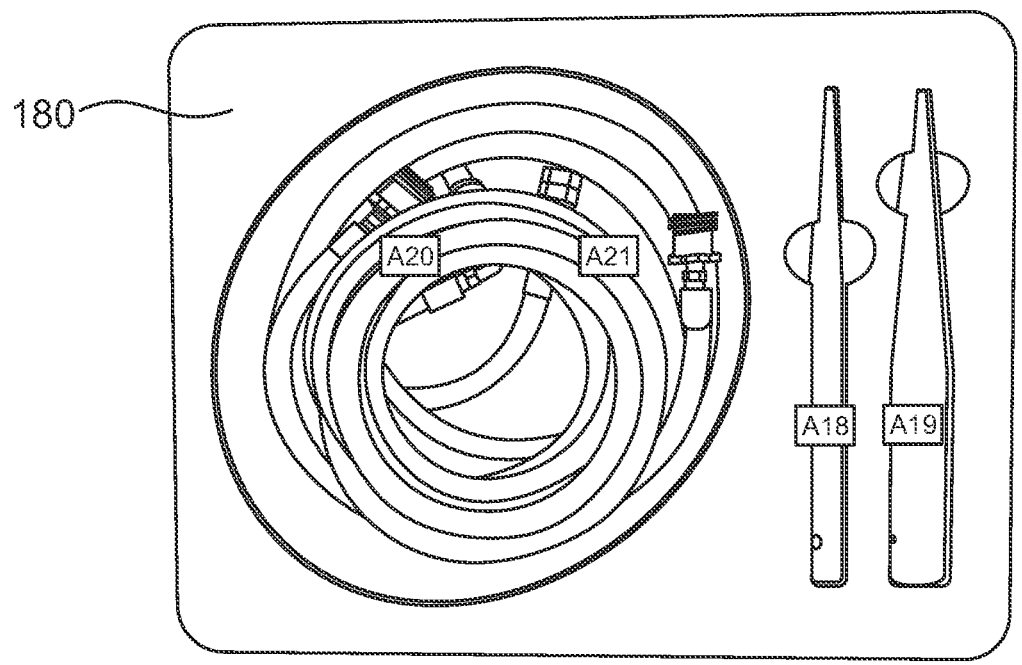
FIG. 5 shows a second level arrangement of components as herein described, vertically positioned from the first level arrangement of components of the first assemblage of FIG. 3.

With reference to FIGS. 3-5, assemblage 160 (hereinafter "Kit A") is shown as a suitcase-like container 175 with pivoting lid 176. Kit A includes foam insert 165 with appropriately sized cutouts or receiving various components. Foam insert includes openings 170 to facilitate removal of foam insert 165 by a responder to access additional components and additional foam insert 180 contained there below. Assemblage 160 can include wheels, handles, telescopic handles, and the like for ease of transportation and carrying to and from leakage events.

Figure 6:
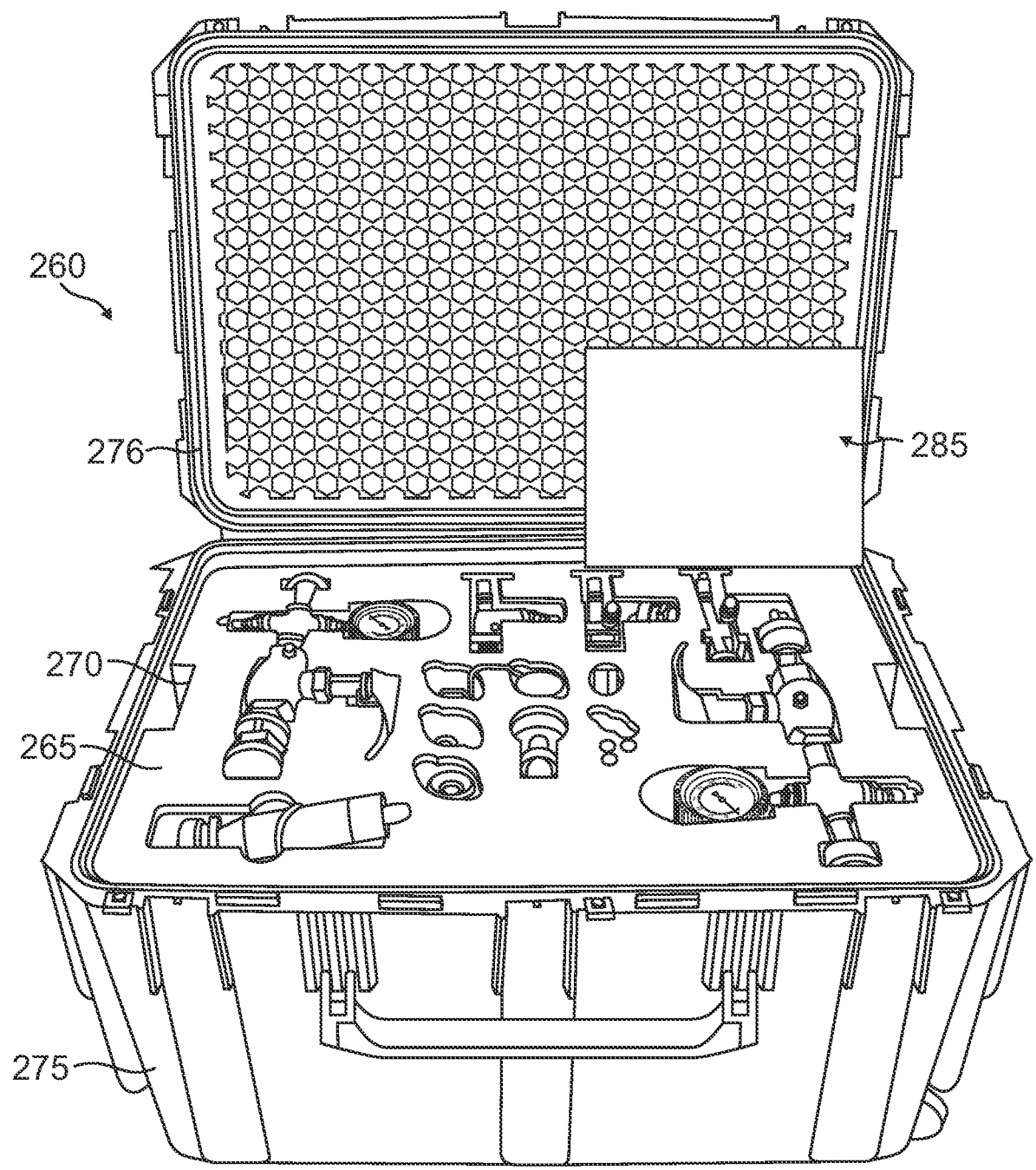
FIG. 6 shows a second assemblage or kit of components useful in carrying out the methods of the present disclosure.
Figure 7:
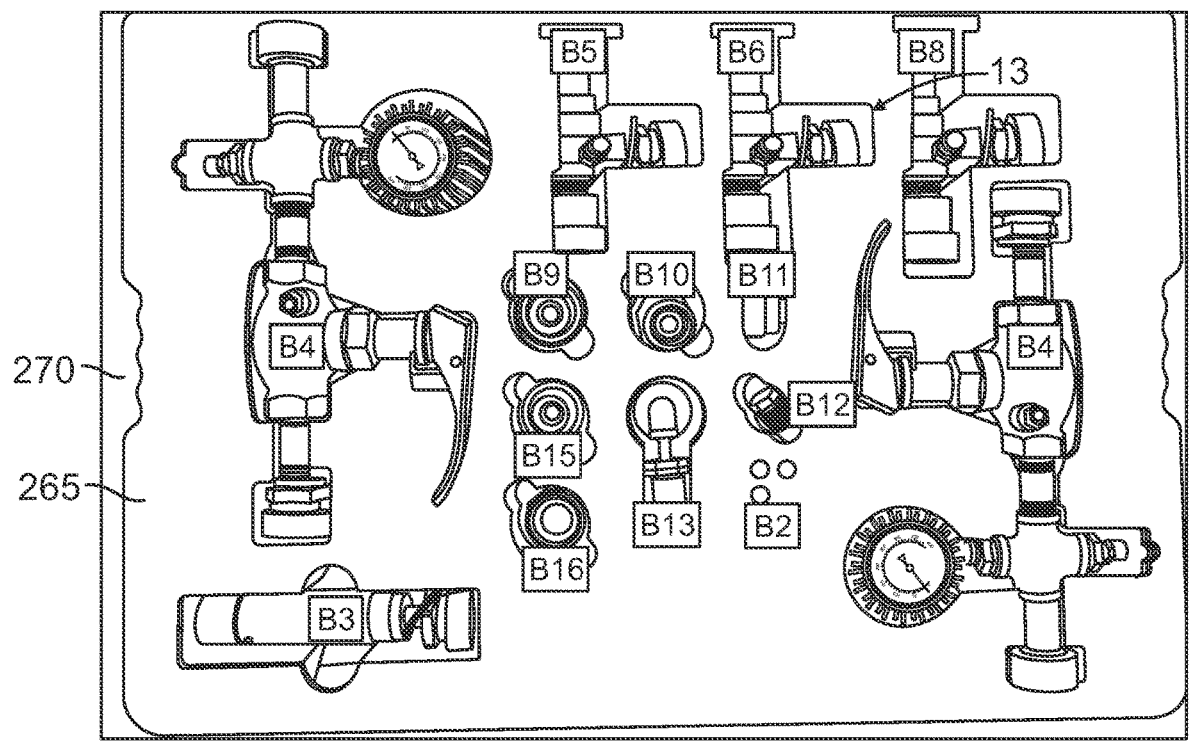
FIG. 7 shows a first level arrangement of components of FIG. 6.
Figure 8:
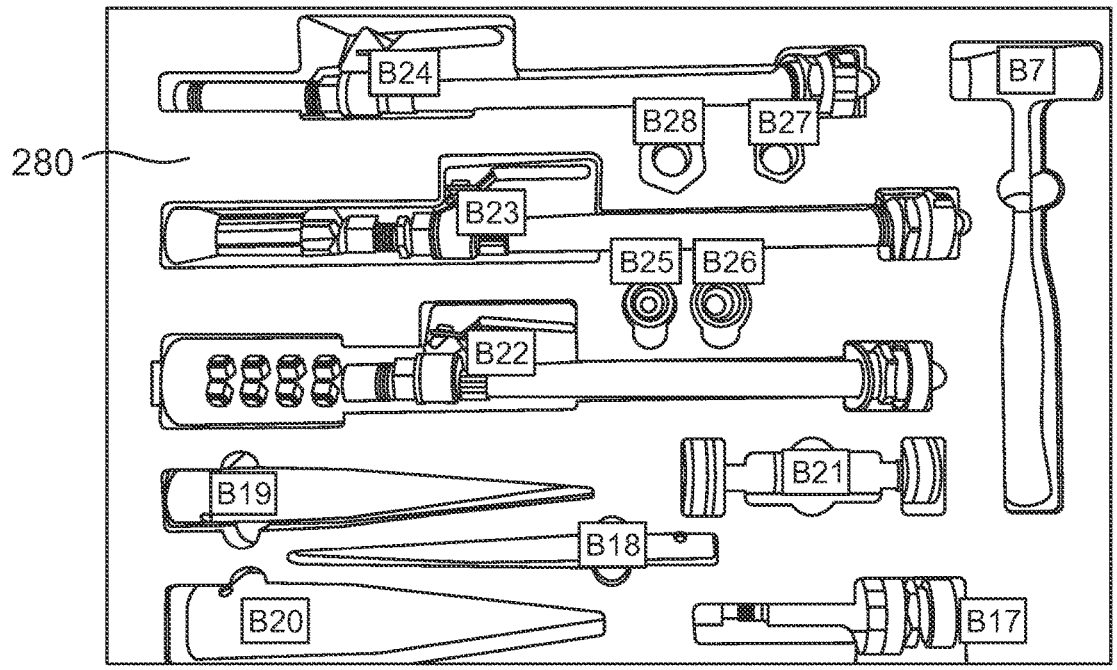
FIG. 8 shows a second level arrangement of components, vertically positioned from the first level arrangement of components of the second assemblage of FIG. 6.

With reference to FIG. 6-8, assemblage 260 (hereinafter "Kit B") is shown as a suitcase-like container 275 with pivoting lid 276. Kit B includes foam insert 265 with appropriately sized cutouts or receiving various components. Foam insert includes openings 270 to facilitate removal of foam insert 265 by a responder to access additional components and additional foam insert 280 contained there below. Assemblage 260 can include wheels, handles, telescopic handles, and the like for ease of transportation and carrying to and from leakage events. In at least one aspect, a responder is provided access to one or both of Kit A and Kit B and their corresponding representation.

An exemplary compilation of components of Kit A and Kit B and examples of their usage in the presently disclosed methods are provided in Table 1 and Table 2, respectively. The arrangement, number, and variety of components may vary to address specific leakage events and/or statistically based (most common) scenarios.

TABLE 1

Exemplary Component designations for Kit A.

| KIT A # | KIT A ITEM DESCRIPTION | EXEMPLARY USE |
| --- | --- | --- |
| A2 | spitter plugs | for replacing missing plugs on a fixed liquid level (outage) indicator on a cylinder or tank |
| A3 | Female-ACME to Male-QCC Adapter 1¾" Female ACME threaded × 1⁵⁄₁₆" Male ACME QCC (CGA 791) threaded | M-QCC end allows for attaching controller A4 and/or leader hose A20; F-ACME end fits fill valves on tanks, forklift cylinders, and large cylinders with multi-valves; (this adapter does not depress the spring-loaded check valves inside ACME fill valves-cannot be used for off-loading contents of cylinder/tank) |
| A4 | Controller Assembly 1⁵⁄₁₆" ACME Female QCC threaded/pressure gauge (0-400 psi)/quick shut off valve; 1¾" Male ACME threaded assembly | 1⁵⁄₁₆" ACME Female QCC threaded for 4-40 pound propane cylinders (BBQ tanks); pressure gauge (0-400 psi) includes hydrostatic relief valve that vents at about 400 psi in the event liquid propane is trapped between quick shutoff valve and cylinder valve; quick shut off valve is configured for one-way flow away from cylinder; 1¾" Male ACME threaded allows hoses to be connected to transfer or flare contents of cylinder/tank |

TABLE 1-continued

Exemplary Component designations for Kit A.

| KIT A # | KIT A ITEM DESCRIPTION | EXEMPLARY USE |
|---|---|---|
| A5 | cap<br>1 5/16" Female ACME QCC threaded | for stopping or slowing minor leaks from portable cylinder (BBQ tank) equipped with a ACME threaded QCC |
| A6 | cap<br>1 1/4" Female ACME QCC threaded | for stopping or slowing minor leaks from forklift cylinder designed for liquid service—not configured for cylinders designed for vapor service or 1 1/4" ACME left threaded adapters |
| A7 | non-sparking hammer | for inserting wooden stakes in openings of the vessel |
| A8 | cap<br>Female POL threaded | for Exchange cylinders or ASME tanks with male POL (CGA 555) liquid service valve, left threaded |
| A9 | Male POL to Male 1 5/16" QCC adapter | for internal threaded female POL portable (BBQ) cylinders; QCC threads are CGA 791.<br>Adapter designed for attachment of controller A4 and/or leader hose A20 |
| A10 | Male 3/8" NPT to Male ACME adapter | NPT end attaches to service valve of forklift or flow buffer (may already be present); ACME end includes internal spring-loaded shut off. Requires adapter A15 so as to depress the plunger and allow liquid flow |
| A11 | cap<br>Female ACME 1 5/16" QCC | used to stop or slow minor leakage from portable cylinder (BBQ) equipped with male 1 5/16" ACME vapor service valve |
| A12 | male POL plug | for cylinders or ASME tanks with female POL (CGA 510) vapor service valve; threaded are left to tighten |
| A13 | Hose adapter<br>female 1 1/4" ACME threaded | for removing liquid contents from the vessel |
| A14 | Leak detection solution | for detecting leaks |
| A15 | 1 1/4" Female ACME to male 1 5/16" QCC adapter | for accessing forklifts cylinder via ACME liquid service valve; Female ACME threads are right-handed;<br>adapter includes internal pin for engaging check valve on forklift adapter for liquid flow;<br>configured for coupling with controller A4 and/or leader hose A20 |
| A16 | Female POL to Male 1 5/16" QCC adapter | For accessing exchange cylinder or tank via the liquid service valve.<br>Female POL threaded fits ASME tanks with mail POL CGA 555 fittings for liquid flow;<br>Male threaded (CGA 791) allows coupling of controller A4 and/or leader hose A20 |
| A17 | DOT SPEC 39 disposable cylinder adapter<br>1" −20 UN female threaded (CGA 600) to 1 5/16" male ACME Q CC threaded | used for disposable spec 39 cylinders without on/off valves. Adapter allows check valve opening when attached;<br>configured to couple with controller and/or A4 leader hose A20 |
| A18 | small wooden stake | short-term temporary plug to facilitate valve replacement |
| A19 | medium wooden stake | short-term temporary plug to facilitate valve replacement |
| A20 | leader hose<br>1 5/16" female ACME QCC threaded and 1 5/16" male ACME QCC threaded (CGA 791) | for flaring or transferring product from cylinder/tank; male ACME end configured for connection to controller A4 |
| A21 | leader hose<br>male POL threaded (CGA 510) and 1 5/16" male ACME QCC threaded (CGA 791) | angled male POL end used for certain vessel orientations or situations where direct controller A4 attachment is prevented or obstructed |

TABLE 2

Exemplary Component inventory of Kit B.

| KIT B# | KIT B ITEM DESCRIPTION | EXEMPLARY USE |
|---|---|---|
| B2 | spitter plugs | for replacing missing plugs on a fixed liquid level (outage) indicator on a cylinder or a tank |
| B3 | Female-QCC to Male-ACME adaptor | female-QCC end allows for coupling to DOT portable cylinders (4-40 pounds; e.g., BBQ); |

TABLE 2-continued

Exemplary Component inventory of Kit B.

| KIT B# | KIT B ITEM DESCRIPTION | EXEMPLARY USE |
|---|---|---|
|  | 1 5/16" female QCC threaded; 1 3/4" male ACME threaded | male ACME end allows for controller B4 or leader hose B27 attachment |
| B4 | Controller Assembly 1 3/4" female ACME threaded/pressure gauge (0-400 psi with hydrostatic relief valve venting at 400 psi)/quick shut off valve/1 3/4" male ACME threaded | female threaded end allows connection to leader hose or various adapters in the presently disclosed kits; hydrostatic relief valve of pressure gauge provided in case liquid propane is trapped between quick shutoff valve and cylinder valve; quick shutoff valve allows one-way flow of contents away from cylinder; male threaded end allows hoses to be connected for transfer or flare of vessel |
| B5 | liquid unloading valve-Male threaded 1 3/4" male ACME threaded × 3/4" NGT threaded | For removal of contents from vessel by accessing the liquid withdrawal valve. ACME end allows for controller B4 and/or leader hose B27 connection; NGT end adapted for older style liquid withdrawal valves with female threads |
| B6 | liquid unloading valve-Female threaded 1 3/4" male ACME threaded × female 1 5/8"−12 UN female threaded | For removal of contents from vessel by accessing the liquid withdrawal valve. Male ACME end allows for controller B4 and/or leader hose B27 connection; 12 UN end adapted for UL listed liquid withdrawal valves with male threads |
| B7 | non-sparking hammer | for inserting wooden stakes in openings associated with the vessel |
| B8 | Liquid unloading valve-ACME 1 3/4" male ACME threaded × 1 3/4" female ACME threaded | For removal of contents from vessel by accessing liquid fill valve (pre-1963); Male ACME end allows for controller B4 and/or leader hose B27 connection; Female ACME end couples to ACME fill valve with internal spring-loaded check valve; |
| B9 | "Piggy Back"-fill valve adapter 1 3/4" male ACME threaded × 1 3/4" female ACME threaded | Male ACME end allows propane fill hose attachment for filling through the "Piggy Back" Female ACME end allows Piggy Back attachment to ACME fill valve |
| B10 | Female vapor return to Male ACME adapter 1 1/4" female ACME threaded × 1 3/4" male ACME threaded | Female ACME end include center pin to push open vapor return valve Male ACME end allows coupling to controller B4 and/or leader hose B27 |
| B11 | Cap POL (CGA510) | for slowing or stopping minor-leakage |
| B12 | POL plug male POL threaded | Used to stop or slow minor leaks from portable cylinders, exchange cylinders, or tank equipped with a vapor service valve male POL threads fits onto cylinders or ASME tanks with female POL (CGA 510) vapor service valve (threads are left to tighten) |
| B13 | Male POL to male ACME adapter male POL threaded × 1 3/4" male ACME threaded | POL end adapted to cylinders or ASME tanks with female POL (CGA 510) vapor service valve (threads are left to tighten) ACME end configured to couple with controller B4 and/or leader hose B27 |
| B14 | Leak detection solution | for detecting leaks |
| B15 | Female ACME to female POL adapter female POL threaded × 1 3/4" male ACME threaded | Female ACME end adapted to female POL (CGA 510) fittings (threads are left to tighten). Male ACME end configured to couple with controller B4 and/or leader hose B27 |
| B16 | Male ACME to male ACME adapter 1 3/4" male ACME threaded at both ends | Used to couple two hoses together |
| B17 | Male POL to male ACME adapter male POL threaded × 1 3/4" male ACME threaded | POL end adapted to cylinders or ASME tanks with female POL (CGA 510) vapor service valve. Threads are left to tighten Male ACME end configured to couple with controller B4 and/or leader hose B27 |
| B18 | small wooden stake | short-term temporary plug to facilitate valve replacement |
| B19 | medium wooden stake | short-term temporary plug to facilitate valve replacement |

TABLE 2-continued

Exemplary Component inventory of Kit B.

| KIT B# | KIT B ITEM DESCRIPTION | EXEMPLARY USE |
|---|---|---|
| B20 | large wooden stake | short-term temporary plug to facilitate valve replacement |
| B21 | Female ACME to female ACME adapter 1¾" female ACME threaded at both ends | Allows coupling together of leader hoses B27 |
| B22 | Flow-through pipe-ACME (with cut off valve) 1¾" female ACME threaded × 1¾" male ACME threaded | For controlling significant leak from a tank or cylinder with ACME fill valve. Female ACME end allows attachment to ACME fill valve (with cut off valve in an open position) Male ACME end configured to couple with controller B4 and/or leader hose B27 |
| B23 | Flow-through pipe-Vapor Return (with cut off valve) 1¼" female ACME threaded × 1¾" male ACME threaded | For controlling significant leak from a tank or cylinder with Vapor Return Valve. Female ACME end allows attachment to Vapor Return Valve (with cut off valve in an open position) Male ACME end configured to couple with controller B4 and/or leader hose B27 |
| B24 | Flow-through pipe-NPT ¾" male NPT threaded × 1¾" male ACME threaded | For controlling leaks from a tank or cylinder when valve is removed/broken off. NPT end allows attachment to threaded opening in a tank or cylinder with removed valve (with cut off valve in an open position) Male ACME end configured to couple with controller B4 and/or leader hose B27 |
| B25 | ¼" NPT to ¾" NPT adapter | For use with NPT flow-through pipe B24 |
| B26 | ½" NPT to ¾" NPT adapter | For use with NPT flow-through pipe B24 |
| B27 | 1" NPT to ¾" NPT adapter | For use with NPT flow-through pipe B24 |
| B28 | 1¼" NPT to ¾" NPT adapter | For use with NPT flow-through pipe B24 |
| B29 | Leader hose 1 ¾" F ACME to 1¾" M ACME | for flaring or transferring product from cylinder/tank; male ACME end configured for connection to controller B4 Female end 1¾ ACME female × 1¾ ACME male |
| B30 | Leader hose 1¾" F ACME with 90 elbow to 1¾" M ACME | for flaring or transferring product from cylinder/tank; male ACME end configured for connection to controller B4 Female end 1¾ ACME female × 1¾ ACME male |

In one aspect, the item numbers A2 through A21 and B2 through B30, as indicated in FIGS. 4 and 6 may be permanently affixed, or otherwise engraved or embossed into or on the particular component so as to facilitate identification commensurate or complementary to the provided representation 285 or other displayable media.

Figure 9A:
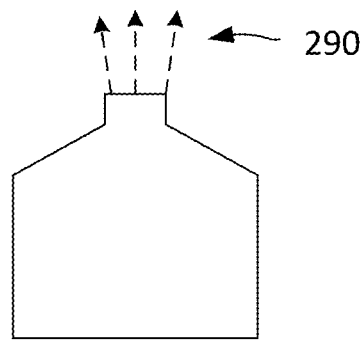
FIGS. 9A, 9B, and 9C, depict a schematic of a leak event scenario and a leakage remediation protocol method and apparatus as disclosed and described.
Figure 9B:
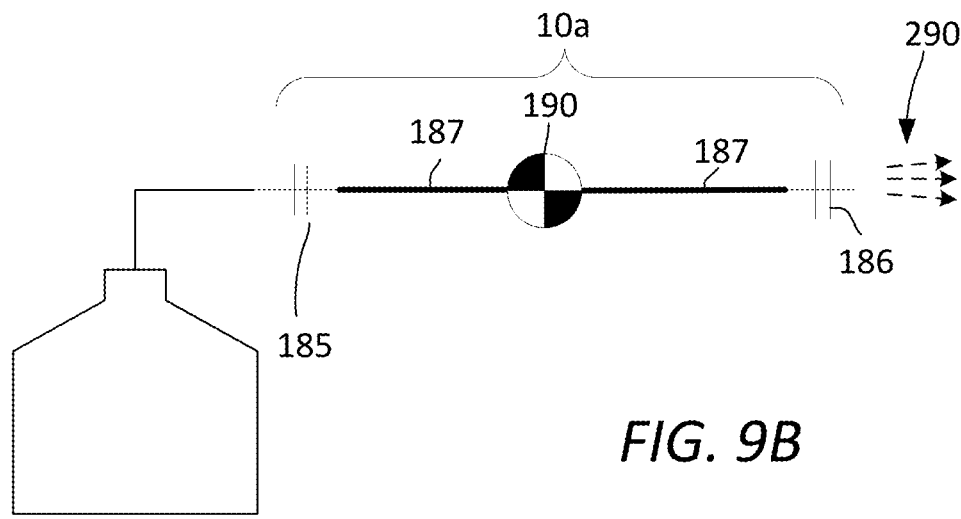
Figure 9C:
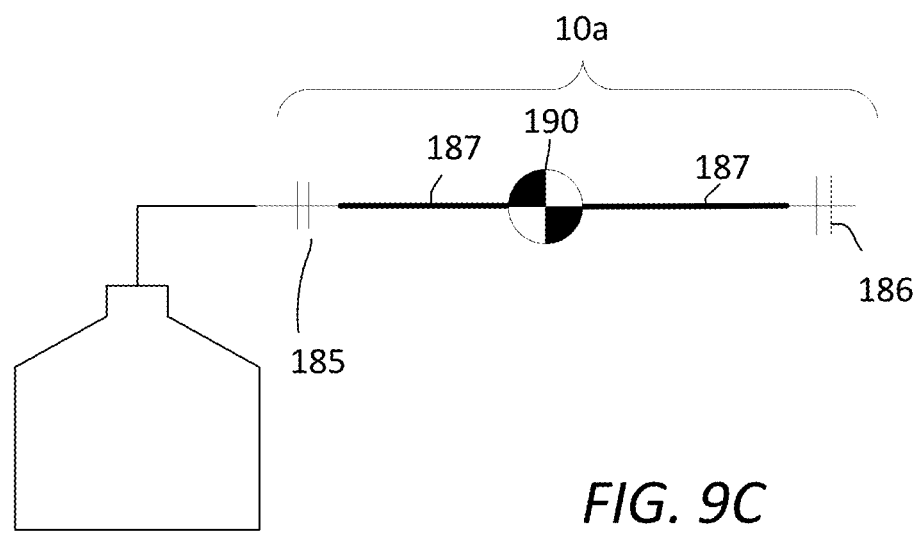

One particular advantageous aspect of the present disclosure is the ability to attach presently disclosed apparatuses to a leaking vessel so as to afford remediation of the leakage event. For example, and with reference to FIG. 9A-9C, a vessel 199 is shown in a leaking state where gas and/or liquid contents 290 are unintentionally releasing. Presently disclosed assembly 10a, having opposing ends, where at one end is a threaded coupler 185 coupled to threaded pipe 187 terminating at an opposing, opened end, whereas the opposing, opened end can include additional threaded coupling 186 (as shown). Assembly 10a includes on-off valve 190 position between opposing ends/threaded couplings 185, 186 (also referred to herein as a "flow-thru pipe"). Attachment of the components, e.g., threaded couplings, pressure gauge, quick closing valve can be by threading, welding and the like. Such an assembly 10a is representative of components B22, B23, and B24 of the second assemblage 260 or Kit B. During use, assembly 10a is configured with the on-off valve 190 open, such that upon attachment to vessel 199, escaping liquid and/or gas is permitted to flow through assembly 10a and allow for proper engagement of the threading 25 to the corresponding threaded coupling of the vessel for transfer or flaring.

Figure 10A:
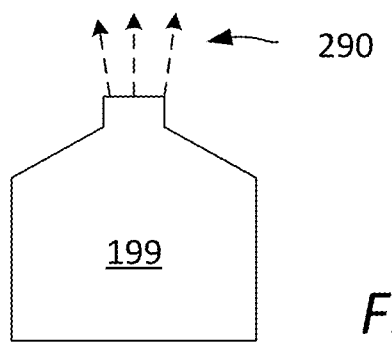
FIGS. 10A, 10B, and 10C, depict a schematic of a leak event and a leakage remediation protocol method and alternate apparatus as disclosed and described.
Figure 10B:
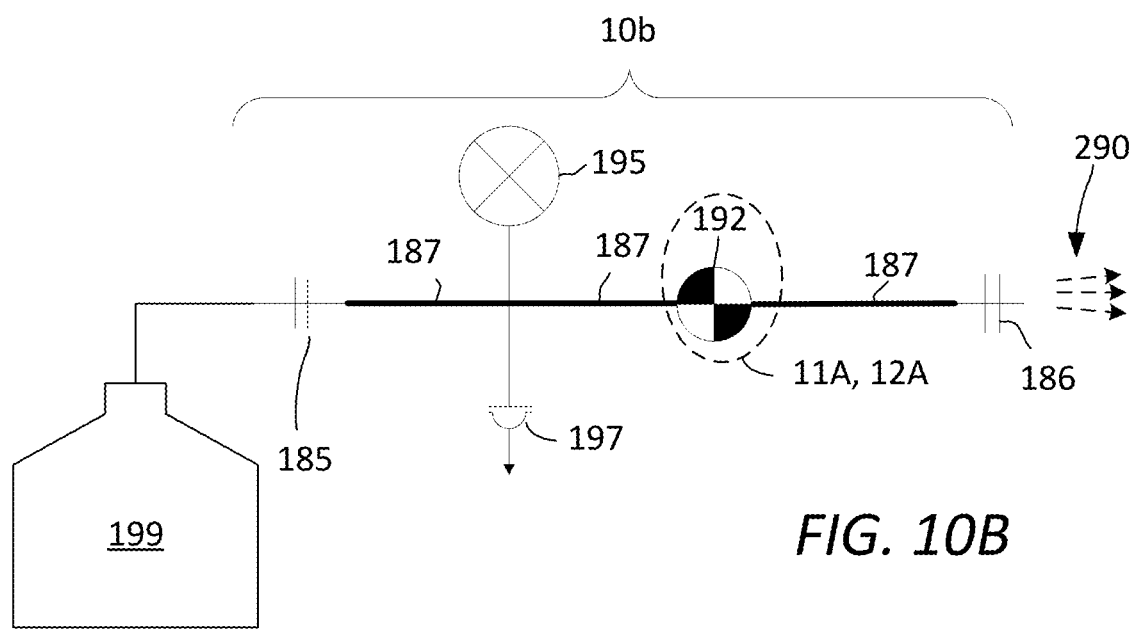
Figure 10C:
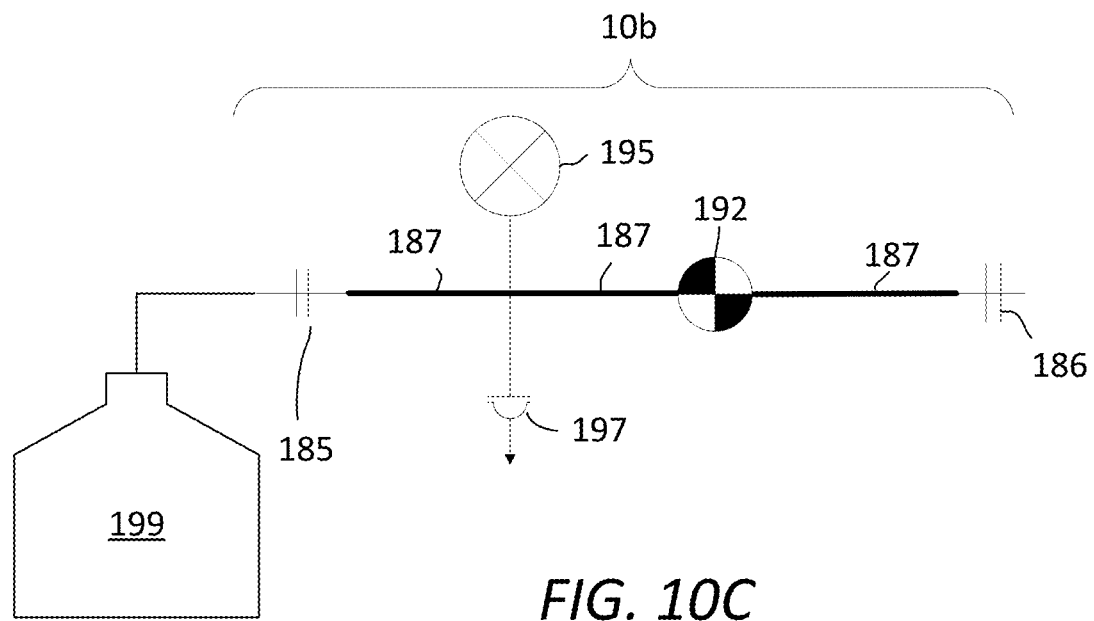

With reference to FIG. 10A-10C, an alternative assembly for use with the methods of the present disclosure is shown and described. Thus, vessel 199 is again shown in a leaking state where gas and/or liquid contents 290 are unintentionally releasing. Controller assembly 10b (for example, component A4 of Kit A or component B4 of Kit B) having opposing ends, at one end is a threaded coupler 185 coupled to threaded pipe 187 terminating at an opposing, opened end, opposing opened end optionally including additional threaded coupling 186. Controller assembly 10b includes quick closing valve 192 position between opposing ends/threaded couplings 185, 186. Controller assembly 10b also comprises a pressure gauge 195 and relief valve 197. In one aspect, pressure gauge 195 can be rated to 400 psi and relief valve 197 rated at 400 psi. Controller 10b is representative of components B22, B23, and B24 of the second assemblage 260 or Kit B. During use, controller assembly 10b is configured with quick closing valve 192 in an open position so as to provide for attachment of threaded coupling 185 to the corresponding threaded coupling of the vessel, such that upon attachment to vessel 199, escaping liquid and/or gas is permitted to flow through assembly 10a for transfer or flaring.

Figure 11A:
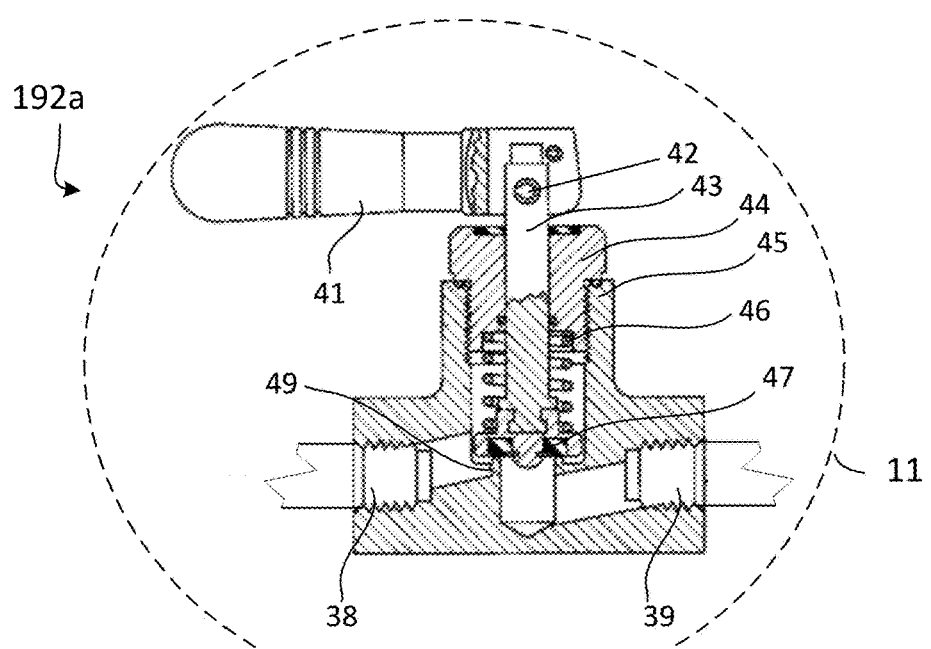
FIGS. 11A and 11B depict a sectional view of a quick-close valve in a closed and an open state, respectively.
Figure 11B:
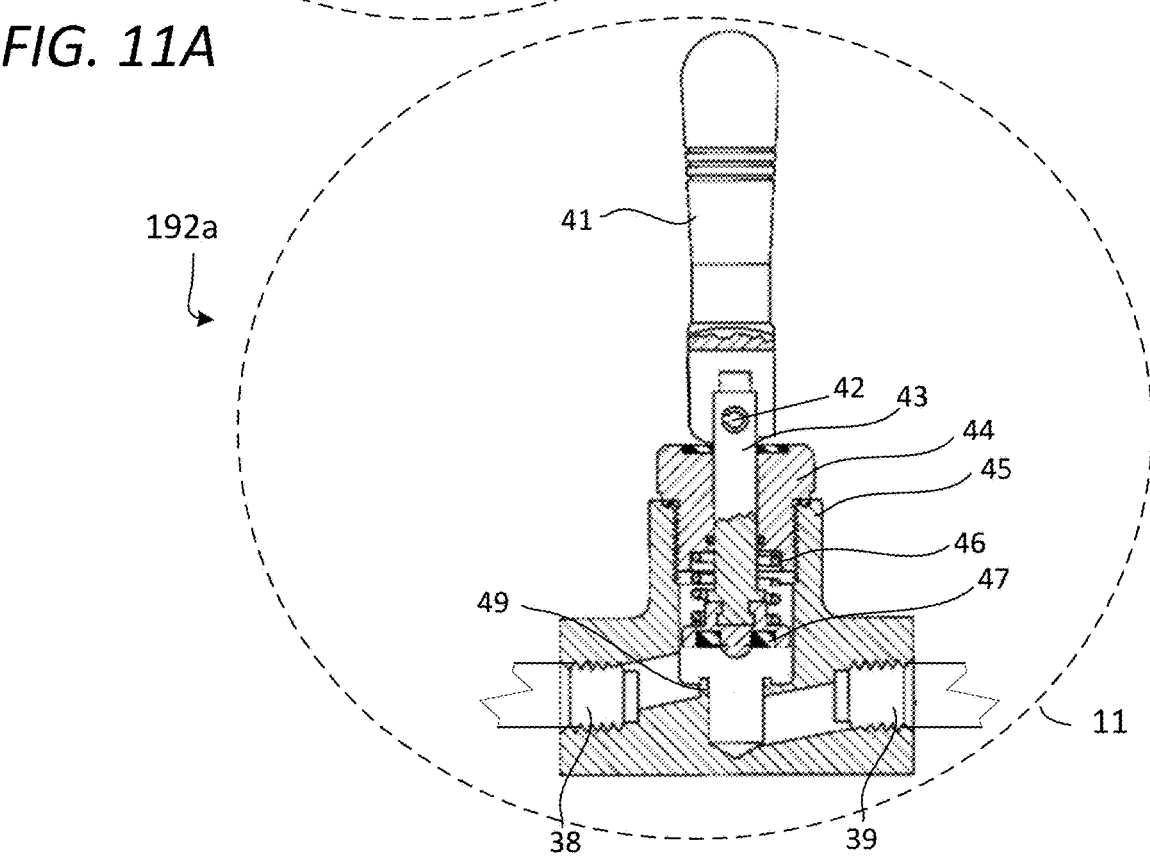

With reference now to FIGS. 11A-11B, quick closing valve 192a is shown in sectional views 11 in a closed state FIG. 11A and in an open state FIG. 11B. As such a valve is known, such as a REGO 7901TA (REGO, Elon, N.C.), or ME791C (Marshall Excelsior Co., Marshall, Mich.), it is only is briefly described, where handle 41 is pivotably attached (at 42) to stem 43 secured to bonnet 44. Bonnet 44 is secured to housing 45 which includes inlet 38 and outlet 39, separated by seal seat 49 which receives seal 47 biased by spring 46. In the closed position, inlet 38 presents fluid/gas above seal seat 49 and seal 47 so as to assist in maintaining the valve in a closed position. In the open position, handle 41 of quick closing valve 192a is rotated to a vertical position relative to stem 43 overcoming bias of spring 46 and lifting seal 47 from seal seat 49 to provide for flow between inlet 38 and outlet 39. In one aspect, one or more quick closing valves 192a are provided in assemblage 160. For example, quick closing valve 192a is used in component A4 together with a pressure gauge, relief valve, and threaded connectors at opposing ends to allow for flow of liquid/gas from a vessel, and once attached at one end to the vessel, to provide for terminating the flow of liquid and gas from the vessel.

Figure 12A:
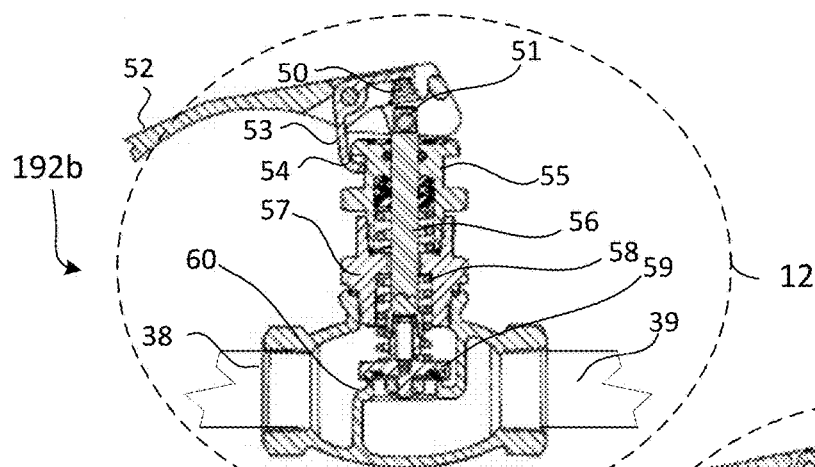
FIGS. 12A, 12B and 12C depict a sectional view of an alternate quick-close valve in a closed/locked state, closed/unlocked state, and an open state, respectively.
Figure 12B:
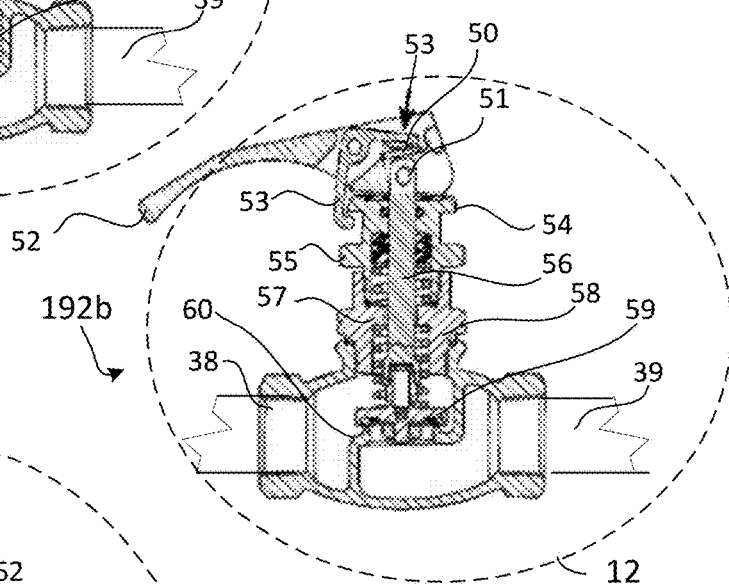
Figure 12C:
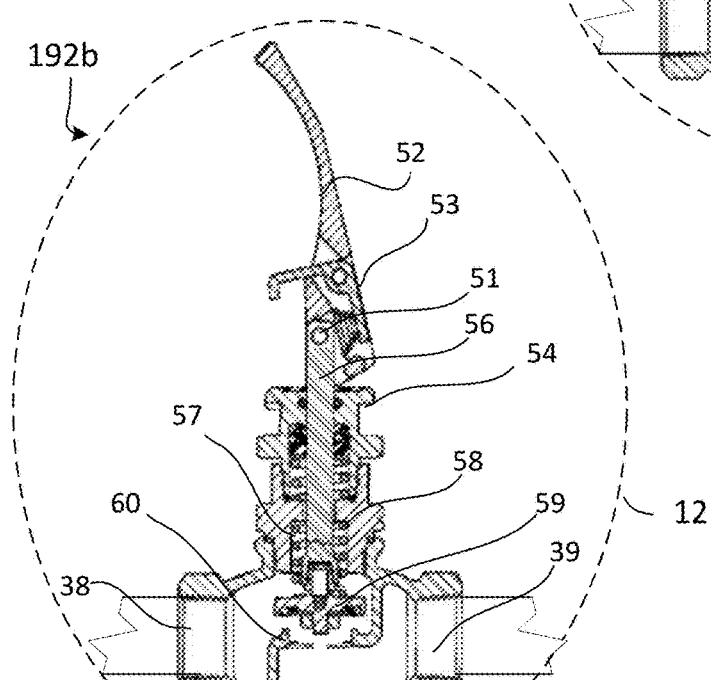

With reference now to FIGS. 12A-12C, quick closing valve 192b is shown in sectional view 12 in a closed state and lock state FIG. 12A, an closed and unlocked state FIG. 12B, and in an open state FIG. 12C. As such a valve is known, such as ME820 (Marshall Excelsior Co., Marshall, Mich.), it is only briefly described, where handle 52 is pivotably attached (at 51) to stem 56 secured to bonnet 55. Bonnet 55 has a lip 54 which receives locking member 53 pivotably attached to handle 52 for locking valve in a closed position. Bonnet 55 is secured to housing 57 which includes inlet 38 and outlet 39, separated by seal seat 60 which receives seal 59 biased by spring 58. In the closed position, inlet 38 presents fluid/gas above seal seat 49 and seal 47 so as to assist in maintaining the valve in a closed position. To open valve 192b, pressure is applied to top of handle 52 as shown by arrow 53 to compress spring 50 and pivot locking member 53 from lip 54 so as to allow rotation of handle 52 to a horizontal position. In the open position, handle 52 of quick closing valve 192a is rotated to a vertical position relative to stem 56 overcoming bias of spring 58 and lifting seal 59 from seal seat 60 to provide for flow between inlet 38 and outlet 39. In one aspect, one or more on-off valves 192b are provided in assemblage 260. For example, quick closing valve 192b is used in component B4 together with a pressure gauge, relief valve, and threaded connectors at opposing ends to allow for flow of liquid/gas from a vessel, and once attached at one end to the vessel, to provide for terminating the flow of liquid and gas from the vessel.

Examples

With reference to FIGS. 13-19, examples are provided showing the use of the assemblages 160, 260 in the methods herein disclosed. Thus, with reference to FIG. 13, "Situation Assessment/Remediation Protocol" flowchart 90 is provided. The various remediation protocols constitute a plurality of event-specific processes that share in common the assemblages, the type of storage vessel and its specific valves/fixtures and the specific leakage event. The various remediation protocols can be identified as first remediation protocol, second remediation protocol, etc., or by using other nomenclature. While it is understood that intervention or countermeasures as part of the remediation protocol described in flowchart 90, are intended as tactical options to be evaluated in a risk-based response manner, and thus, such tactical options are not intended to be performed in a step by step manner, but nonetheless, may be carried out in such a manner, depending on the particular situation. Thus, at Step 91, identifying and determining various types of cylinders involved in the leak event is shown as an initial step. Step 92 provides for ascertaining the source or sources of leakage. Decision Step 93 requires determining if remediation of the leak is feasible or otherwise possible and if not, Step 94 suggests evacuation of the area. If remediation of the leak is feasible or otherwise possible Step 95 provides for choosing appropriate equipment from the appropriate Kit A or Kit B as well as referencing any representation material such as disclosed in FIGS. 20-25. Steps 96, 97 and 98 involve the choosing of the appropriate component from the Kit(s) 160, 260 and one or more remediation protocols further described below and in FIG. 13, such as the flaring or transferring of the contents of the leaking vessel in accordance with the methods herein disclosed.

Figure 13:
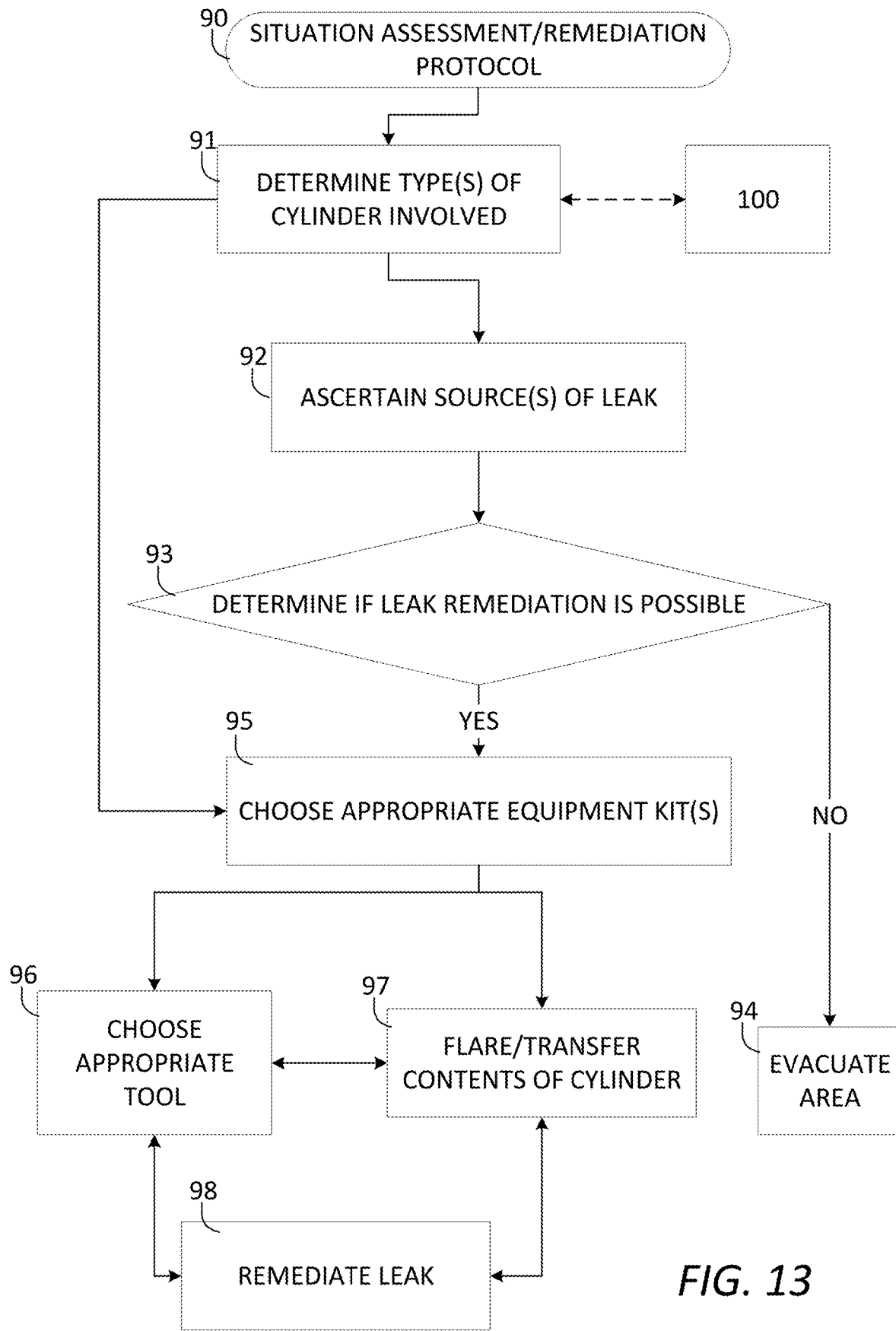
FIG. 13 depicts a situation assessment flow chart corresponding to a method disclosed and described herein.
Figure 14:
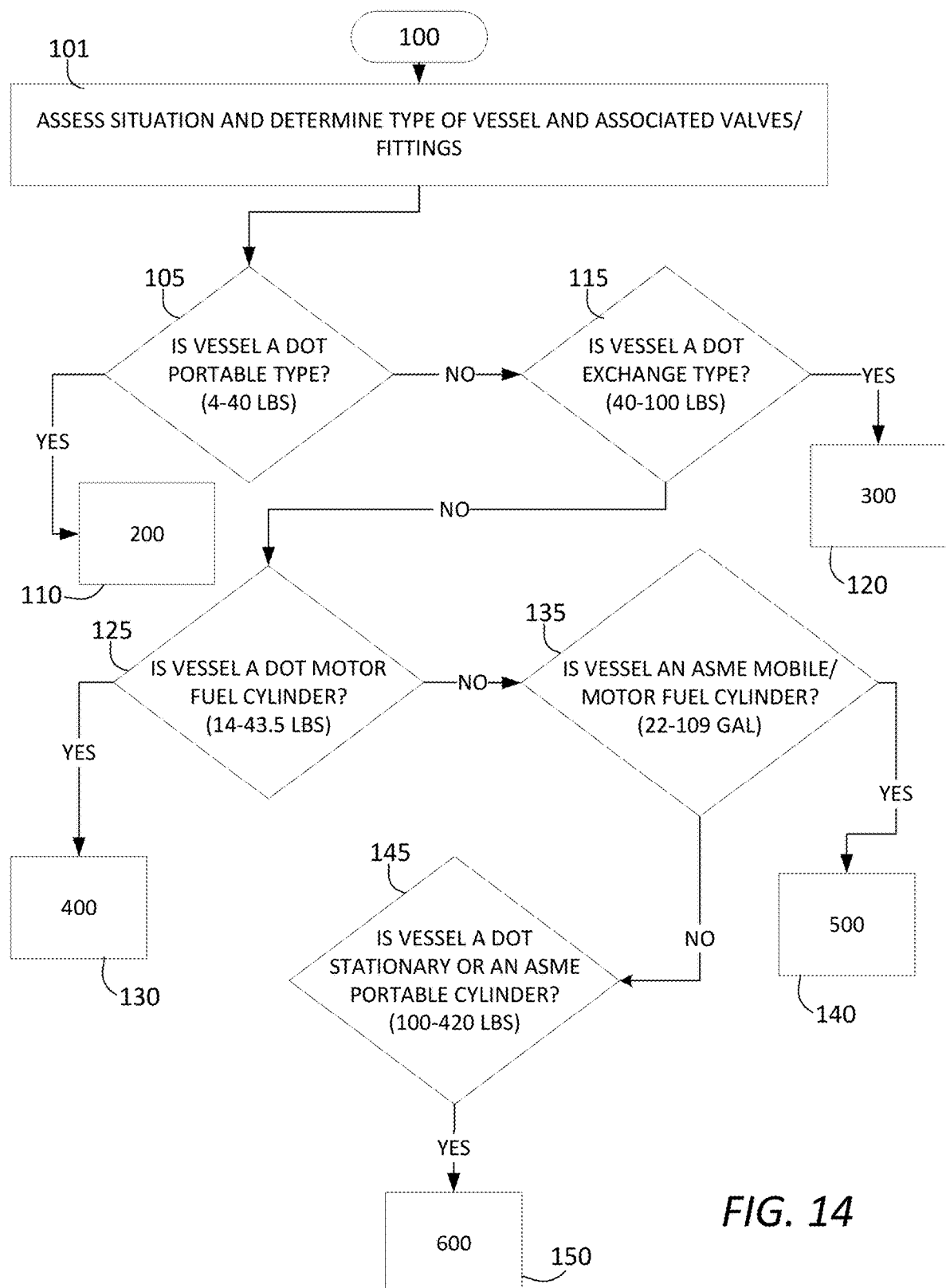
FIG. 14 depicts a vessel assessment flow chart corresponding to a method disclosed and described herein.

Method step 91 as shown in FIG. 13 makes reference to process 100, as shown with reference to FIG. 14, where the ascertainment of the type of vessel and associated valves and fittings are ascertained at Step 101.

Figure 15:
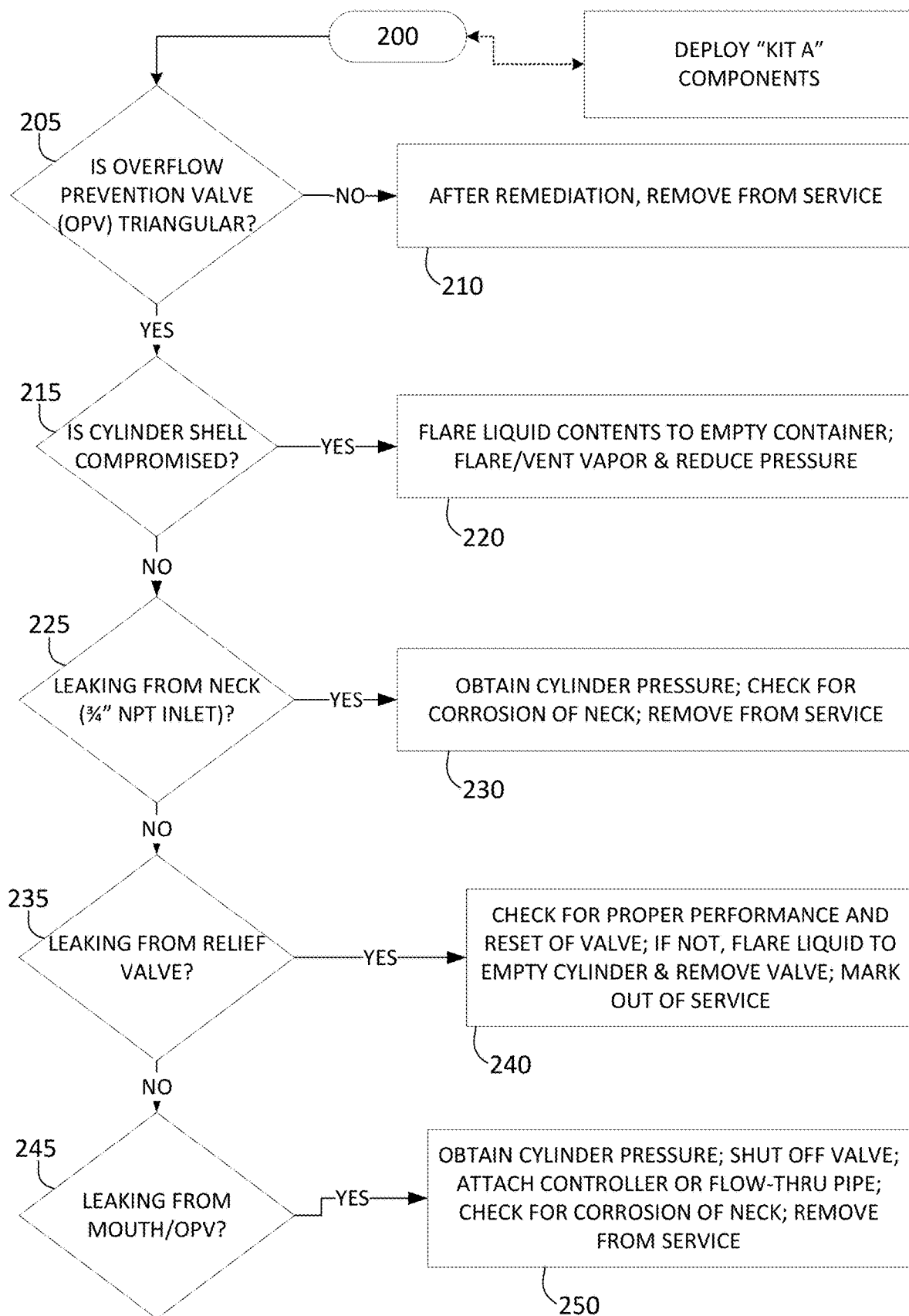
FIG. 15 depicts a vessel-specific leakage remediation protocol flow chart corresponding to a leak remediation apparatus and method disclosed and described herein.

Continuing with the description of process 100, a determination is made at Step 105 whether the vessel is a cylinder DOT portable type with a capacity of 4 to 40 pounds, and if so, the flowchart directs the responder to Step 110 and remediation protocol 200, which is now described with reference to FIG. 15. While it is understood that intervention or countermeasures described in remediation protocol 200 are intended as tactical options to be evaluated in a risk-based response manner, and thus, such tactical options are not intended to be performed in a step by step manner, but nonetheless, may be carried out in such a manner or maybe carried out in an order different from those depicted, depending on the particular situation. Process 200 indicates the deployment of Kit A and its components, by way of example, further comprising by way of Step 205, the determination of whether the outlet valve is an overflow prevention valve (OPV) type of a triangular shape, and if not, that the out of date cylinder should be taken out of service after remediation, as in Step 210. Upon ascertaining that a modern OPV outlet valve is present, Step 215 provides instruction as to determining whether the cylinder shell is otherwise compromised, and if so, the appropriate remediation being to flare the liquid contents to an empty container, using for example, controller assembly A4 and/or suitable leader hose A20/21 of assemblage 160/Kit A, as well as flaring liquid contents and venting vapor contents so as to reduce pressure as indicated in Step 220. If the cylinder shell is not otherwise compromised, Step 225 instructs determining if leaking is from the neck of the inlet valve, which is normally a three-quarter inch NPT, and if so, Step 230 suggests obtaining cylinder pressure (e.g., using controller assembly A4 with or without additional components of assemblage 160/ Kit A) to remediate the leakage and if necessary to take the cylinder out of service. Having eliminated leaking from the neck, Step 235 provides for ascertaining whether leaking is from the relief valve, and if so to ascertain whether the relief valve is otherwise functioning normally and/or in need of reset, and if not, flaring liquid to empty the cylinder so as to remove and replace the valve and/or mark the cylinder "out of service" (OOS), as in Step 240. Having eliminated leaking from the relief valve, Step 245 provides for determining whether leaking is from the mouth of the OPV and, if so, Step 250 suggests obtaining the leaking cylinder's pressure, for example by attaching controller assembly A4 with the quick closing valve 192 in its open state, and then and closing the quick closing valve 192.

Figure 16:
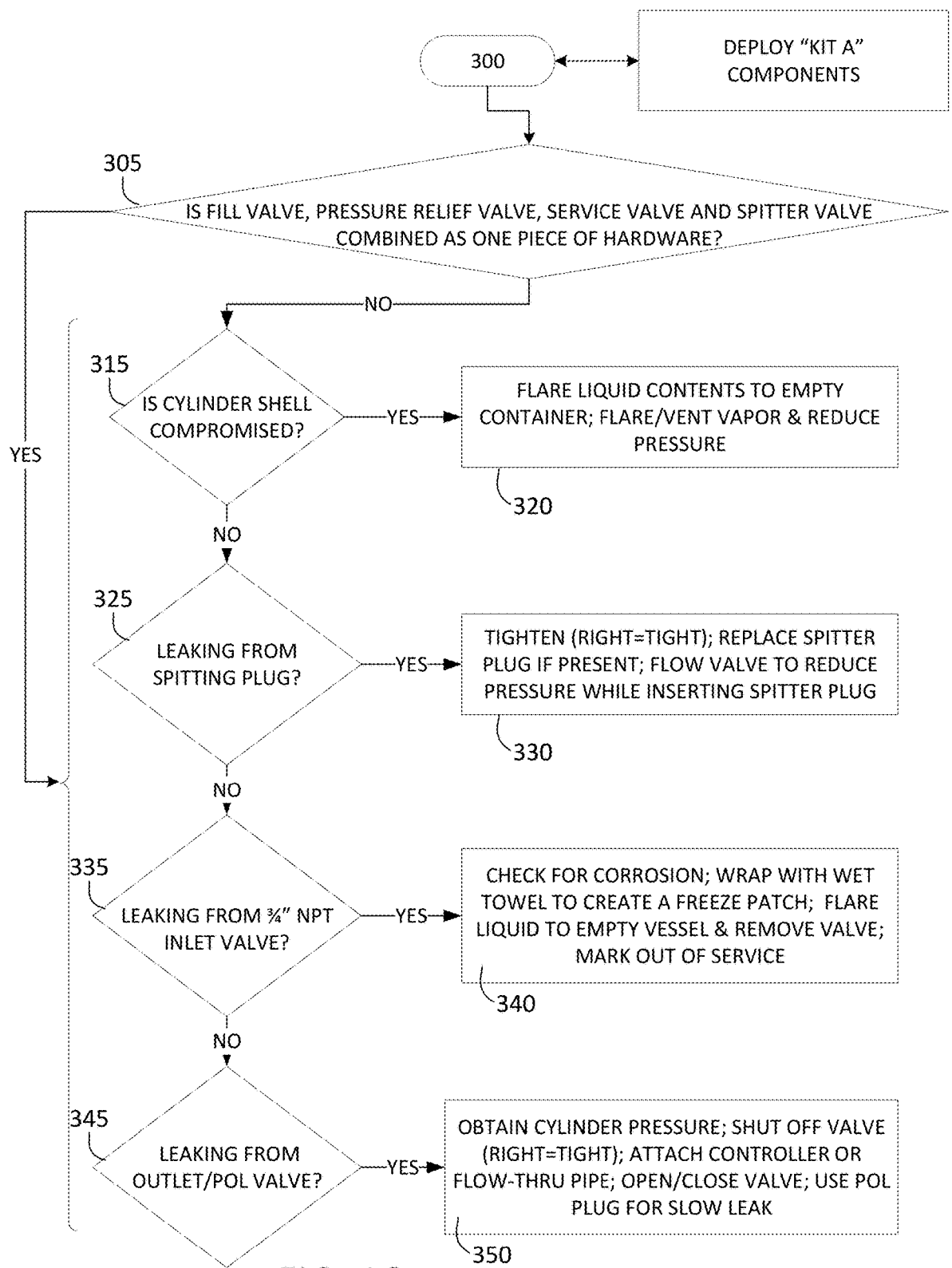
FIG. 16 depicts another vessel-specific leakage remediation protocol flow chart corresponding to a leak remediation apparatus and method disclosed and described herein.

Referring back to FIG. 14, after eliminating the type of vessel as being a DOT portable type, flowchart 100 at Step 115 provides for a determination whether the vessel is a DOT exchange type vessel with a capacity of 40 to 100 pounds, and if so, Step 120 directs the responder to remediation protocol 300, which initially indicates deployment of Kit A and its components, with reference to FIG. 16. While it is understood that intervention or countermeasures described in remediation protocol 300 are intended as tactical options to be evaluated in a risk-based response manner, and thus, such tactical options are not intended to be performed in a step by step manner, but nonetheless, may be carried out in such a manner as illustrated or maybe carried out in an order different from those depicted, depending on the particular situation. At Step 305, of process 300, an initial determination pertains to ascertaining whether the vessel comprises a one piece hardware component that includes a fill valve, pressure relief valve, service valve and spitter valve. Leak Counter measures are the same. A single multi-valve only changes the location of the valves (tightly clustered vs spread out) and how we show the picture to the responder for recognition purposes. Once ascertained, Step 315 relates to ascertaining whether the vessel shell is compromised, and if so, flare the liquid contents to an empty container as well as flaring and venting vapor so as to reduce pressure, as indicated in Step 320. Having ascertained the vessel shell is not compromised, Step 325 suggests determining if leaking is from the spitting plug (if present), and if so, to tighten the spitting plug, or alternatively, if missing or present and nonfunctional, to install or replace the spitter plug while opening flow valve to reduce pressure for replacing or installing the spitter plug, as indicated in Step 330. Having eliminated leaking from the spitting plug, Step 335 indicates determining whether leaking is from the three-quarter inch NPT inlet valve, and if so, checking for corrosion and/or wrapping with a wet towel so as to create a freeze patch, flaring the liquid present so as to empty the vessel and to remove/replace the leaking NPT inlet valve as well as marking the vessel out of service, as indicated in Step 340. Having eliminated leaking from the NPT inlet valve, Step 345 indicates determining whether leaking is from the outlet/POL valve, and if so, obtaining vessel pressure, for example using controller assembly A4, so as to shut off the valve, alternatively, cycling open and closing of the valve and/or using a POL plug, for example component A12 of Kit A, if it is determined that the leak is small and slow, as indicated in Step 350. In the event that a flow-through pipe is needed, a flow through pipe from Kit B can be used, but as such cylinders tend to lose pressure quickly and self-cool, such a component may not be needed.

Figure 17:
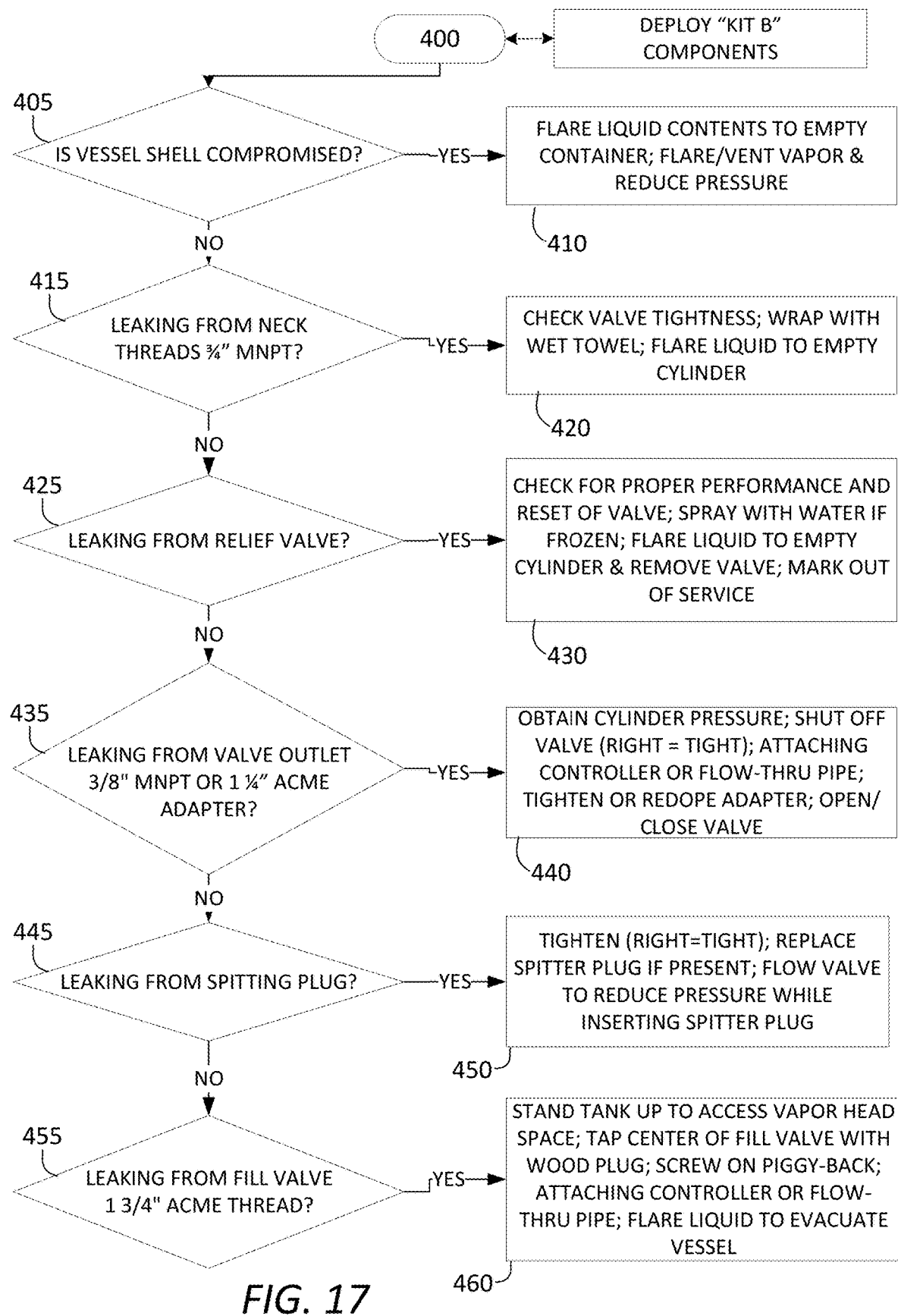
FIG. 17 depicts another vessel-specific leakage remediation protocol flow chart corresponding to a leak remediation apparatus and method disclosed and described herein.

Referring back to FIG. 14, after eliminating the type of vessel as being a DOT exchange type, Step 125 provides for ascertaining whether the vessel is a DOT motor fuel cylinder with a capacity of 14 to 43 pounds, and thus directs the responder to remediation protocol 400 at Step 130, and to deploy Kit A, as depicted in FIG. 17. While it is understood that intervention or countermeasures described in remediation protocol 400 are intended as tactical options to be evaluated in a risk-based response manner, and thus, such tactical options are not intended to be performed in a step by step manner, but nonetheless, may be carried out in such a manner or maybe carried out in an order different from those depicted, depending on the particular situation. Thus, at Step 405 a determination of whether the vessel shell is compromised is made, and if so, Step 410 indicates flaring the vessel's liquid contents to an empty container as well as flaring and venting vapor so as to reduce pressure in the vessel. Having ascertained at the vessel shell is not compromised, Step 415 provides for determining whether leaking from the neck threads of the ¾" MNPT fitting is occurring, and if so, to check the tightness of the fitting (with caution as to tightening against pressure) and/or wrapping with a wet towel so as to provide for a "freeze patch" and if necessary, to flare the liquid content to an empty cylinder, as indicated in Step 420. Step 425 provides for determining whether leaking is from the relief valve, and if so, checking for proper performance and/or resetting of the relief valve and/or spraying with water (should the valve be frozen) and if necessary flaring liquid contents to an empty cylinder for removal of the valve with appropriate marking out of service, as indicated in Step 430. At Step 435, leaking from the valve outlet, which is either a ⅜" MNPT or a 1¼" ACME adapter, would be ascertained, and if so, obtaining the cylinder pressure and/or shutting off the valve and/or attaching controller assembly A4 or flow-through pipe (component A4, with its quick close valve in the open position, can be used as a flow-through pipe, for example) and/or tightening or re-doping adapter as well as opening and closing the valve, as indicated in Step 440. Step 445 indicates determining whether leaking is from the spitting plug, and if so, to tighten the spitting plug, or alternatively, if missing or present and nonfunctional, to install or replace the spitter plug while opening flow valve to reduce pressure for replacing or installing the spitter plug, as indicated in step 450. At Step 455, a determination of whether leaking is from the fill valve, which is normally a 1¾" ACME thread is made, and if so, to stand up the vessel to access the vapor headspace and/or to tap center of the fill valve with a wooden plug and/or to screw on a piggyback connector, such as component B9, and/or to flare liquid to an empty container, as indicated in Step 460.

Figure 18:
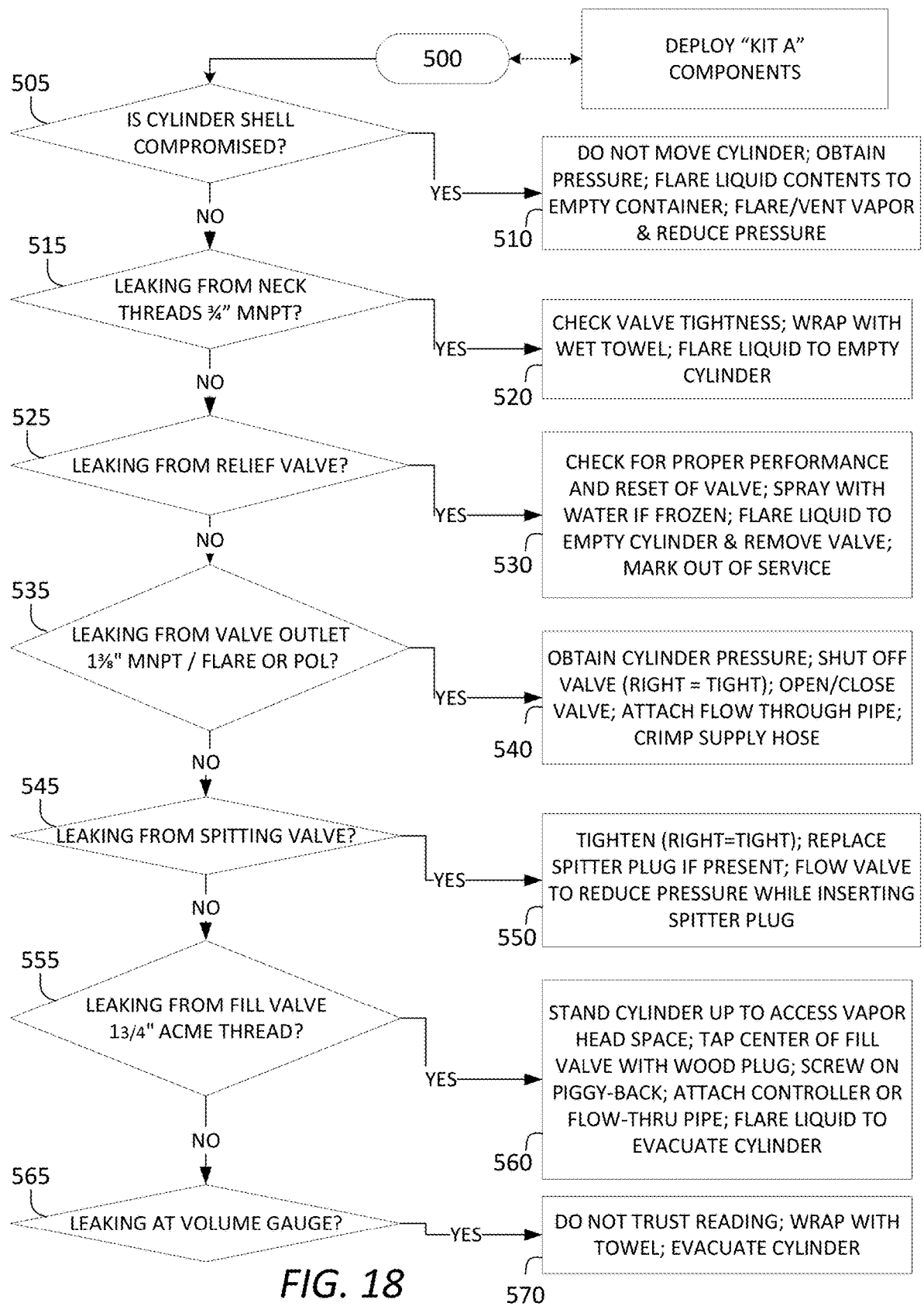
FIG. 18 depicts another vessel-specific leakage remediation protocol flow chart corresponding to a leak remediation apparatus and method disclosed and described herein

Referring back to FIG. 14, after eliminating the type of vessel as being a DOT motor fuel cylinder, Step 135 provides for ascertaining whether the vessel is a ASME mobile/motor fuel cylinder of about 22-109 gallon capacity, and directs the responder to remediation protocol 500 at Step 140, and to deploy Kit B, as depicted in FIG. 18. While it is understood that intervention or countermeasures described in remediation protocol 500 are intended as tactical options to be evaluated in a risk-based response manner, and thus, such tactical options are not intended to be performed in a step by step manner, but nonetheless, may be carried out in such a manner or maybe carried out in an order different from those depicted, depending on the particular situation. Thus, at Step 505 a determination of whether the vessel shell is compromised is suggested and if so, Step 510 indicates avoiding moving the cylinder and obtaining the pressure of the cylinder and/or flaring liquid contents to an empty container as well as flaring and venting vapor so as to reduce pressure. Having ascertained at the vessel shell is not compromised, Step 515 indicates determining whether leaking from the neck threads of the ¾" MNPT fitting is occurring, and if so, to check the tightness of the fitting and/or wrapping with a wet towel so as to provide for a freeze patch, and if necessary to flare the liquid content to an empty cylinder, as indicated in Step 520. Step 525 indicates determining whether leaking is from the relief valve, and if so, checking for proper performance and/or resetting of the relief valve and/or spraying with water (should the valve be frozen) and if necessary flaring liquid contents to an empty cylinder for removal of the valve with appropriate marking out of service, as indicated in Step 530. At Step 535, leaking from the valve outlet, which is either a 1% inch MNPT/FLARE or POL adapter, can be ascertained and if so, obtaining the cylinder pressure and/or shutting off the valve and/or attaching controller assembly A4 and/or a flow-through pipe (component A4 can be used as a flow-through pipe, with its quick close valve in the open position, but unlikely needed on a cylinder of this type) and/or crimping supply hose, as indicated in Step 540. Step 545 indicates determining whether leaking is from the spitting plug, and if so, to tighten the spitting plug, or alternatively, if missing or present but nonfunctional, to install or replace the spitter plug while opening flow valve to reduce pressure while replacing or installing the spitter plug, as indicated in step 550. At Step 555, a determination of whether leaking is from the fill valve, which is normally a 1¾"ACME thread is made, and if so, to stand the cylinder up so as to access the vapor headspace and/or to tap center of fill valve with a wooden plug and/or to screw on a piggyback connector, such as component B9 and/or to flare liquid to an empty container so as to evacuate vessel, as indicated in Step 560. At Step 565, a determination is made as to whether leaking is occurring at the volume gauge, and if so, not to necessarily trust the reading of the volume gauge and/or wrap the gauge with a wet towel and/or evacuate the cylinder, as indicated in Step 570.

Figure 19:
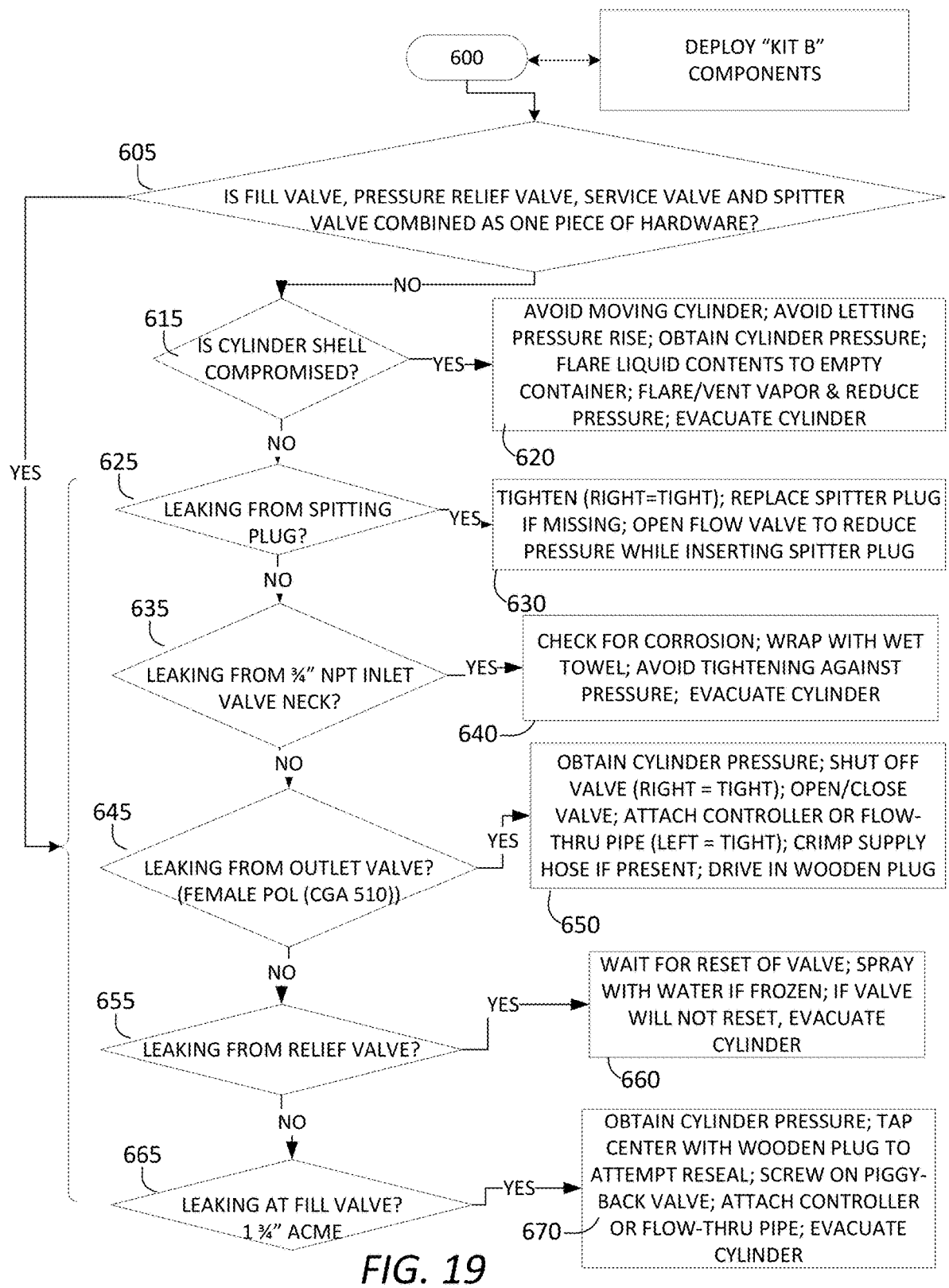
FIG. 19 depicts another vessel-specific leakage remediation protocol flow chart corresponding to a leak remediation apparatus and method disclosed and described herein
Figure 20:
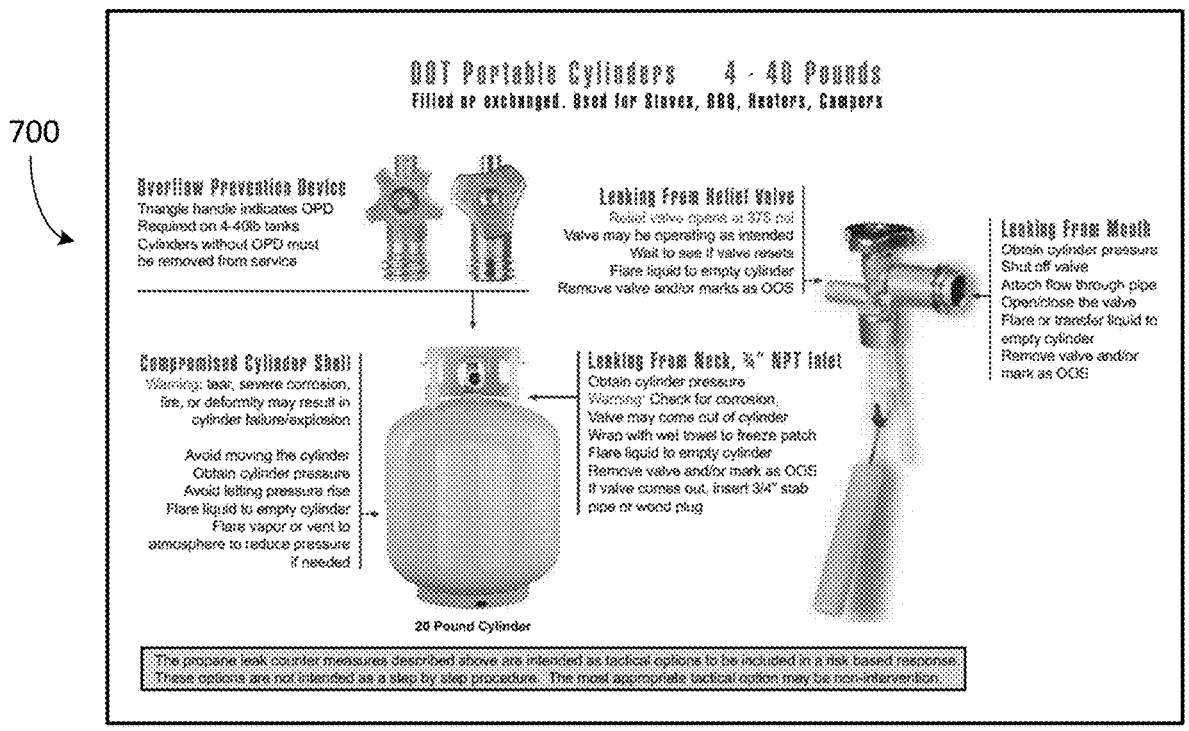
FIG. 20 shows a portion of a representation providing a framework to capture procedures and tactical information.
Figure 21:
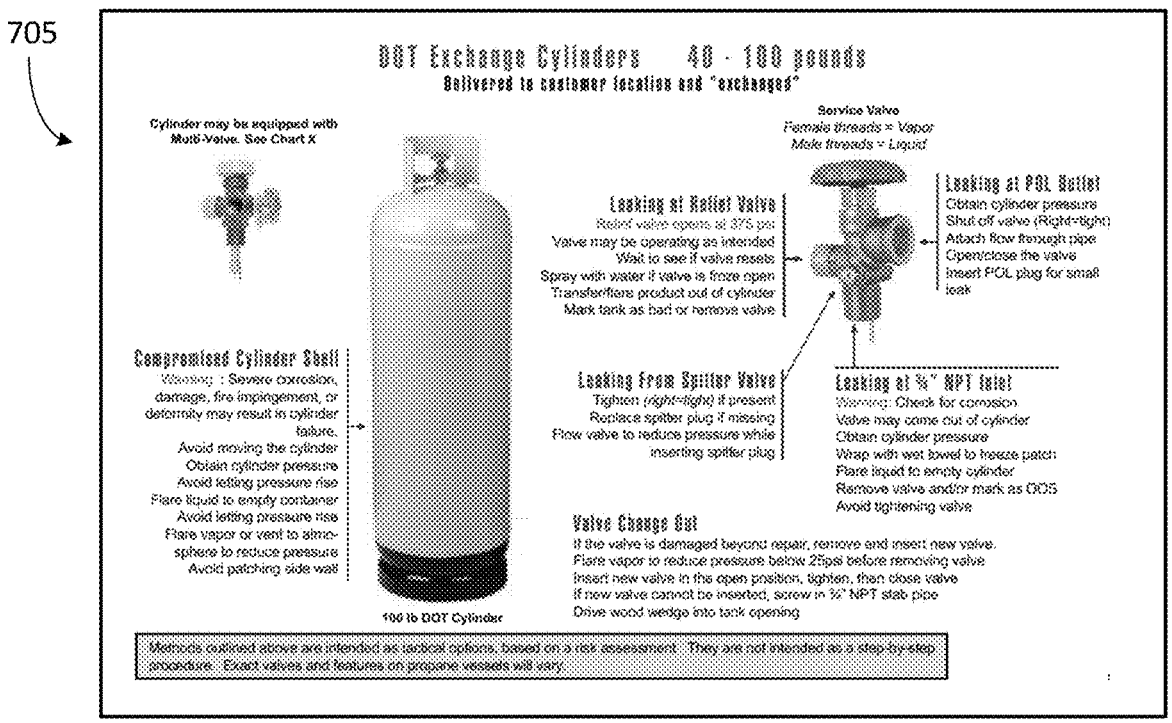
FIG. 21 shows another portion of a representation providing a framework to capture procedures and tactical information.
Figure 22:
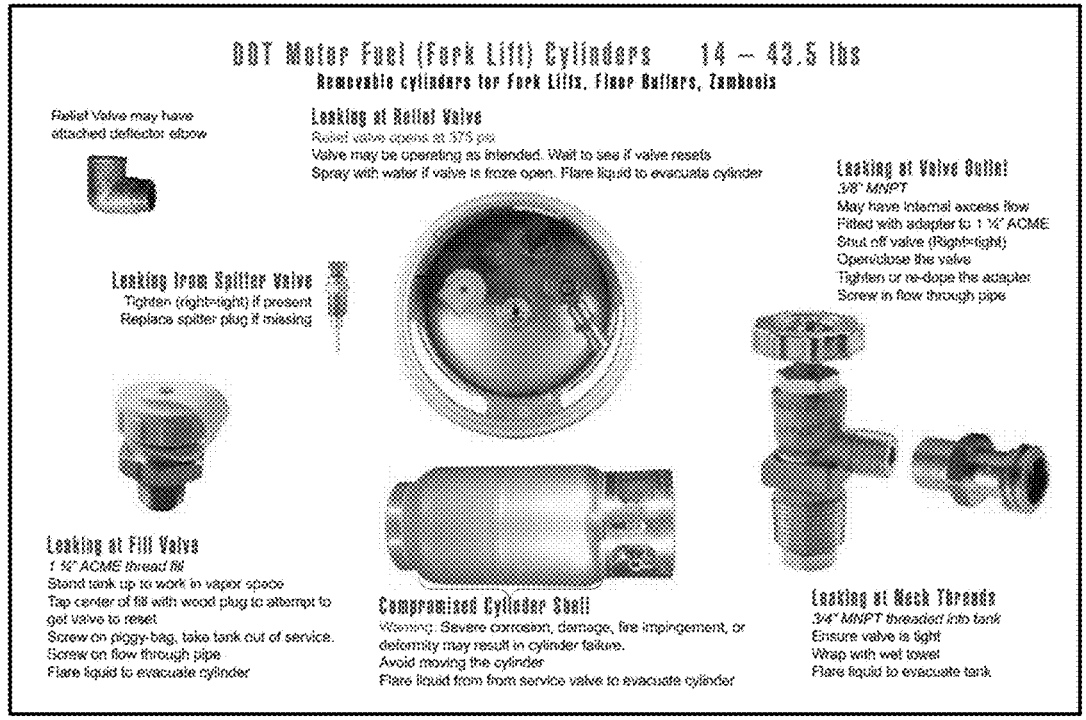
FIG. 22 shows another portion of a representation providing a framework to capture procedures and tactical information.
Figure 23:
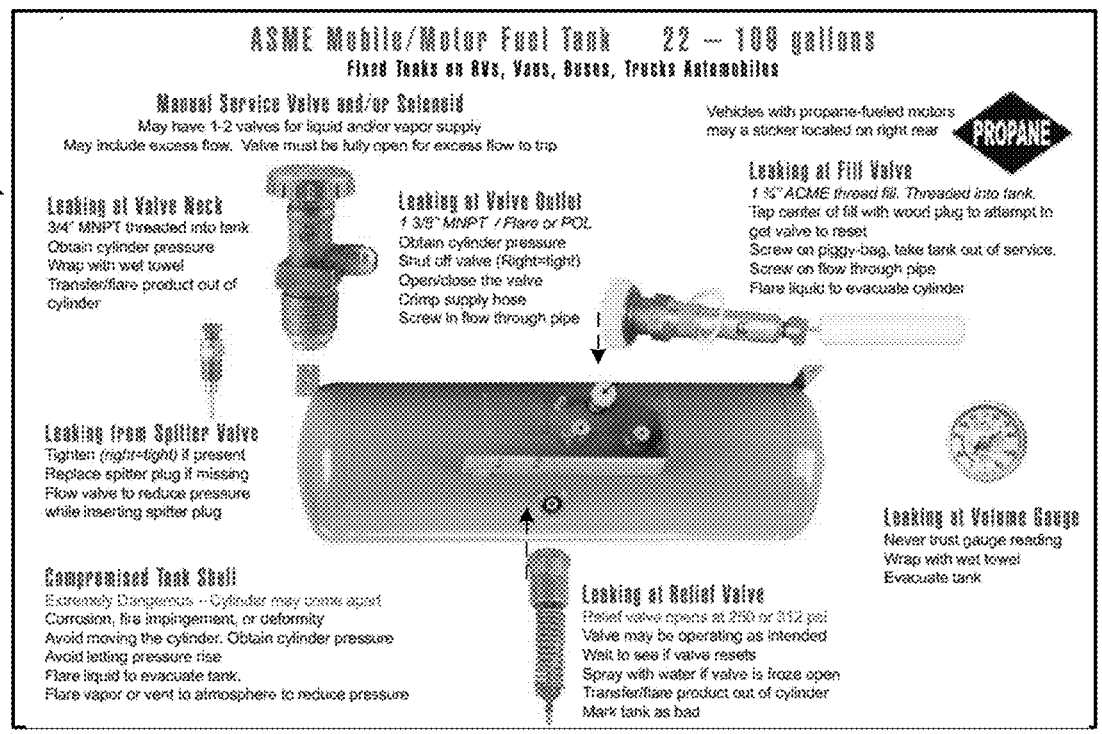
FIG. 23 shows another portion of a representation providing a framework to capture procedures and tactical information.

Referring again back to FIG. 14, after eliminating the type of vessel as being an ASME mobile/motor fuel cylinder, Step 145 provides for ascertaining whether the vessel is a DOT stationary cylinder (above or below ground) or an ASME portable cylinder with capacity of 100 to 420 pounds, and directs the responder to remediation protocol 600 at Step 150, and to deploy Kit B, as depicted in FIG. 19. While it is understood that intervention or countermeasures described in remediation protocol 600 are intended as tactical options to be evaluated in a risk-based response manner, and thus, such tactical options are not intended to be performed in a step by step manner, but nonetheless, may be carried out in such a manner or maybe carried out in an order different from those depicted, depending on the particular situation. At Step 605, an initial determination pertains to ascertaining whether the vessel comprises a one piece hardware component that includes a fill valve, pressure relief valve, service valve and spitter valve. Once ascertained, Step 615 relates to ascertaining whether the vessel shell is compromised, and if so, to avoid moving the cylinder and to avoid letting the pressure rise and/or obtaining cylinder pressure and/or to flare the liquid contents to an empty container as well as flaring and venting vapor so as to reduce pressure an evacuating the contents of the shell-compromised cylinder, as indicated in Step 620. Having ascertained the vessel shell is not compromised, Step 625 suggests determining if leaking is from the spitting plug (if present), and if so, to tighten the spitting plug, or alternatively, if missing or present and nonfunctional, to install or replace the spitter plug while opening flow valve to reduce pressure for replacing or installing the spitter plug, as indicated in Step 630. Having eliminated leaking from the spitting plug, Step 635 indicates determining whether leaking is from the ¾" NPT inlet valve, and if so, checking for corrosion and/or wrapping with a wet towel so as to create a freeze patch, flaring the liquid contents so as to evacuate the cylinder while avoiding tightening against pressure, as indicated in Step 640. Having eliminated leaking from the NPT inlet valve, Step 645 indicates determining whether leaking is from the outlet/POL valve, and if so, obtaining vessel pressure, for example using controller assembly B4 and/or flow-through pipe, so as to shut off the valve, alternatively, cycling open and closing of the valve and/or driving in a wooden plug, for example component B18-B20 and/or crimping the supply hose if present, as indicated in Step 650. Step 655 indicates determining whether leaking is from the relief valve, and if so, checking for proper performance and/or resetting of the relief valve and/or spraying with water should the valve be frozen and if unsuccessful, commencing cylinder evacuation, as indicated in Step 660. At Step 665, a determination of whether leaking is from the fill valve, which is normally a 1¾" ACME thread is made, and if so, obtain cylinder pressure and/or tapping center with wooden plug in an attempt to reseal and/or to screw on a piggyback connector, such as component B9 and/or to flare liquid to an empty container so as to evacuate vessel, as indicated in Step 670.

The present disclosure also provides methods of training responders to use the PropaneIQ Response System of the disclosure. The training includes familiarizing responders with various leak scenarios corresponding to common storage vessels likely to be the subject of such an event and the deployment of such responders. The representation 285 can be provided in physical form such as a placard or flip-cards or other fixed media and is used in combination with the various components of the kits for correlating such components for use with typical valves, ports, outlets and other features commonly present about such vessels subject to leakage events. This familiarization is performed by providing for the responders to be trained and provided a copy of one or more fixed media or included with the disclosed kits so as to quickly ascertain the type of vessel, source of leakage, and instructions as to how to use the various components of the kit in remediating the leak. The fixed media can be any of those described herein, including representations as shown in FIGS. 20-25, or digital representations provided to one or more screens associated with a smart phone, computer, and the like.

For example, with reference to FIGS. 20-24, representations 700, 705, 710, 715, 720, and 725 graphically and or in combination with text provide for facilitating identification of particular type of vessel, identifying the source of leak under various leakage scenarios, and providing recommendations as to remediation of the leak event. By way of example, representations 700, 705, 710, 715, 720 illustrate a collection of cards or flip cards containing graphical images and text corresponding to various DOT cylinders and DOT tanks, valve components, and remedial actions as well as properties of the compressed gas/liquid contained therein. Such representations can be provided by a mobile app, and the like to be displayed on a smart phone or other video device or via remote assistance, e.g., Facetime and the like. The training further includes familiarizing responders with remedial actions that should be performed to remediate and/or abate the threat posed by the various scenarios.

Examples are shown in FIGS. 20-25, herein and by way of example only, use propane storage vessels as the exemplary liquid/compressed gas storage cylinder in a leak-incident-event scenario. Such representations are useful for other storage vessels containing other compressed gas and liquid form.

I claim:
1. A controller assembly comprising:
   a threaded coupling at each of a first end and at a second end of a flow-thru pipe arrangement;
   a pressure gauge coupled to the pipe arrangement; and
   a valve coupled to the pipe arrangement, the valve having an open state where fluid flow between said first end and said second end of the pipe arrangement is provided, and a second state where fluid flow between said first end and said second end of the pipe arrangement is prevented;

wherein the controller assembly is configured to couple at said first end of the pipe arrangement with a DOT or ASME propane storage vessel that is unintentionally releasing compressed propane gas and liquid propane, and wherein the controller assembly includes an assemblage of remediation components to respond to the DOT or ASME propane storage vessel leakage event and to provide remediation at the leakage event, the assemblage of remediation components comprising at least one of a first assemblage of components and a second assemblage of components, wherein the first assemblage of components comprises two or more of the following: at least one spitter plug; a female-ACME to male-QCC adapter (1¾" female ACME threaded×1 5/16"-male ACME QCC (CGA 791) threaded; a cap (1 5/16"-female ACME QCC threaded); a cap (1¼"-female ACME QCC threaded); a non-sparking hammer; a cap (female POL threaded); a male POL to male 1 5/16"-QCC adapter; a male ⅜" NPT to male ACME adapter; a cap (female ACME 1 5/16"-QCC); a male POL plug; a hose adapter (female 1¼" ACME threaded); a leak detection solution; a 1¼" female ACME to male 1 5/16"-QCC adapter; a female POL to male 1 5/16"-QCC adapter; a DOT SPEC 39 disposable cylinder adapter (1"-20 UN female threaded (CGA 600) to 1 5/16"-male ACME QCC threaded); one or more wooden stakes; a leader hose (1 5/16"-female ACME QCC threaded and 1 5/16"-male ACME QCC threaded (CGA 791)); or a leader hose (male POL threaded (CGA 510) and 1 5/16"-male ACME OCC threaded (CGA 791)), and wherein the second assemblage of components comprises two or more of the following: one or more spitter plug; a female-QCC to male-ACME adaptor (1 5/16"-female QCC threaded; 1¾" male ACME threaded); a liquid unloading valve (1¾" male ACME threaded×¾" NGT threaded); a liquid unloading valve (1¾" male ACME threaded×female 1⅝"-12 UN threaded); a liquid unloading valve (1¾" male ACME threaded×1¾" Female ACME Threaded); Non-Sparking Hammer; a Fill Valve Adapter (1¾" male ACME threaded×1¾" female ACME threaded); female vapor return to male ACME adapter (1¾" female ACME threaded×1¾" male ACME threaded); a cap (POL (CGA510)); a male POL threaded plug; a male POL to male ACME adapter (male POL threaded×1¾" male ACME threaded); a leak detection solution; female ACME to female POL adapter (female POL threaded×1¾" male ACME threaded); a male ACME to male ACME adapter (1¾" male ACME threaded at both ends); a male POL to male ACME adapter (male POL threaded×1¾" male ACME threaded); one or more small wooden stakes; a female ACME to female ACME adapter (1¾" female ACME threaded at both ends); a ACME flow-through pipe assembly (1¾" female ACME threaded/cut off valve/1¾" male ACME threaded); a Vapor Return flow-through pipe assembly (1¾" female ACME threaded/cut off valve/1¾" male ACME threaded); a NPT flow-through pipe assembly (¾" male NPT threaded/cut off valve/1¾" male ACME threaded); a ¼" NPT to ¾" NPT adapter; a ½" NPT to ¾" NPT adapter; a ½" NPT to ¾" NPT adapter; a 1¼" NPT to ¾" NPT adapter; a leader hose (male POL×male QCC threads); or a leader hose (male POL with 90 degree bend and male QCC threads).

2. The controller assembly of claim 1, wherein said first end is a 1 5/16" ACME female QCC threaded coupling.

3. The controller assembly of claim 1, wherein said first end is a 1¾" female ACME threaded coupling.

4. The controller assembly of claim 1, wherein the valve is a quick release close valve.

* * * * *

UNITED STATES PATENT AND TRADEMARK OFFICE
CERTIFICATE OF CORRECTION

PATENT NO. : 11,614,204 B2
APPLICATION NO. : 15/449871
DATED : March 28, 2023
INVENTOR(S) : Gary Sharp It is certified that error appears in the above-identified patent and that said Letters Patent is hereby corrected as shown below:

In the Claims

In Claim 1, Column 19, Line 20, delete "threaded×$1^5/_{16}$″-male" and insert -- threaded × $1^5/_{16}$″ male --.

In Claim 1, Column 19, Line 21, delete "($1^5/_{16}$″-female" and insert -- ($1^5/_{16}$″ female --.

In Claim 1, Column 19, Line 22, delete "($1^1/_4$″-female" and insert -- ($1^1/_4$″ female --.

In Claim 1, Column 19, Line 24, delete "$1^5/_{16}$″-QCC" and insert -- $1^5/_{16}$″ QCC --.

In Claim 1, Column 19, Line 25, delete "$1^5/_{16}$″-QCC" and insert -- $1^5/_{16}$″ QCC --.

In Claim 1, Column 19, Line 28, delete "$1^5/_{16}$″-QCC" and insert -- $1^5/_{16}$″ QCC --.

In Claim 1, Column 19, Line 29, delete "$1^5/_{16}$″-QCC" and insert -- $1^5/_{16}$″ QCC --.

In Claim 1, Column 19, Line 31, delete "$1^5/_{16}$″-male" and insert -- $1^5/_{16}$″ male --.

In Claim 1, Column 19, Line 32, delete "$1^5/_{16}$″-female" and insert -- ($1^5/_{16}$″ female --.

In Claim 1, Column 19, Line 33, delete "$1^5/_{16}$″-male" and insert -- $1^5/_{16}$″ male --.

In Claim 1, Column 19, Line 35, delete "$1^5/_{16}$″-male ACME OCC" and insert -- $1^5/_{16}$″ male ACME QCC --.

In Claim 1, Column 19, Line 39, delete "($1^5/_{16}$″-female" and insert -- ($1^5/_{16}$″ female --.

In Claim 1, Column 20, Line 2, delete "threaded×$^3/_4$″" and insert -- threaded × $^3/_4$″ --.

In Claim 1, Column 20, Line 4, delete "threaded×female" and insert -- threaded × female --.

Signed and Sealed this
Twenty-third Day of May, 2023

Katherine Kelly Vidal
*Director of the United States Patent and Trademark Office*

CERTIFICATE OF CORRECTION (continued)
U.S. Pat. No. 11,614,204 B2

In Claim 1, Column 20, Line 6-7, delete "Female ACME Threaded); Non-Sparking Hammer; a Fill Valve Adapter ($1^{3}/_{4}''$ male ACME threaded×$1^{3}/_{4}''$" and insert -- female ACME threaded); non-sparking hammer, a fill valve adapter ($1^{3}/_{4}''$ male ACME threaded × $1^{3}/_{4}''$ --.

In Claim 1, Column 20, Line 9, delete "($1^{3}/_{4}''$ female ACME threaded×$1^{3}/_{4}''$" and insert -- ($1^{1}/_{4}''$ female ACME threaded × $1^{3}/_{4}''$ --.

In Claim 1, Column 20, Line 12, delete "threaded×$1^{3}/_{4}''$" and insert -- threaded × $1^{3}/_{4}''$ --.

In Claim 1, Column 20, Line 14, delete "threaded×$1^{3}/_{4}''$" and insert -- threaded × $1^{3}/_{4}''$ --.

In Claim 1, Column 20, Line 17, delete "threaded×$1^{3}/_{4}''$" and insert -- threaded × $1^{3}/_{4}''$ --.

In Claim 1, Column 20, Line 23, delete "($1^{3}/_{4}''$ female" and insert -- ($1^{1}/_{4}''$ female --.

In Claim 1, Column 20, Line 28, delete "a $1/_{2}''$ NPT to $3/_{4}''$ NPT" and insert -- a $1''$ NPT to $3/_{4}''$ NPT --.

In Claim 1, Column 20, Line 29, delete "POL×male" and insert -- POL × male --.